US012695815B2

(12) United States Patent
Kamaraj

(10) Patent No.: US 12,695,815 B2
(45) Date of Patent: Jul. 28, 2026

(54) DATA COMMUNICATION PROTOCOLS FOR DATA TRANSMISSION AND SOFTWARE ASSURANCE IN A CLOUD ENVIRONMENT

(71) Applicant: Oracle International Corporation, Redwood Shores, CA (US)

(72) Inventor: Ravi Shankar Kamaraj, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 103 days.

(21) Appl. No.: 18/958,385

(22) Filed: Nov. 25, 2024

(65) Prior Publication Data

US 2026/0149757 A1 May 28, 2026

(51) Int. Cl.
H04L 67/56 (2022.01)
H04L 67/10 (2022.01)

(52) U.S. Cl.
CPC .............. H04L 67/56 (2022.05); H04L 67/10 (2013.01)

(58) Field of Classification Search
CPC ......... H04L 67/56; H04L 67/10; H04L 63/00; H04L 29/06
See application file for complete search history.

(56) References Cited

U.S. PATENT DOCUMENTS

| | | | |
|---|---|---|---|
| 12,547,482 B1 * | 2/2026 | Sayar | G06F 9/5072 |
| 2024/0195810 A1 * | 6/2024 | Hayes | H04L 63/166 |
| 2024/0364689 A1 * | 10/2024 | Potlapally | H04L 9/0891 |
| 2024/0422248 A1 * | 12/2024 | Howarth | H04L 69/22 |
| 2025/0384165 A1 * | 12/2025 | Hoermann | G06F 21/6227 |

* cited by examiner

*Primary Examiner* — Chris Parry
*Assistant Examiner* — Steven C Nguyen
(74) *Attorney, Agent, or Firm* — Mughal Gaudry & Franklin PC

(57) ABSTRACT

Techniques for data communication protocols for data transmission and software assurance in a cloud environment are disclosed. Data is received from a first component and at a first adapter using a first communication protocol. The data is transmitted, by the first adapter and to a proxy, using a second communication protocol. The proxy audits the data, and (i) blocks passage of the data, or (ii) forwards the data to a second adapter using the second communication protocol, to cause the second adapter to transmit the data to a second component using the first communication protocol. The proxy is within a tenancy of a cloud environment. The first adapter and the first component are within a first section of the cloud environment. The second adapter and the second component are within a second section of the cloud environment. Neither of the first or second sections is within the tenancy.

26 Claims, 10 Drawing Sheets

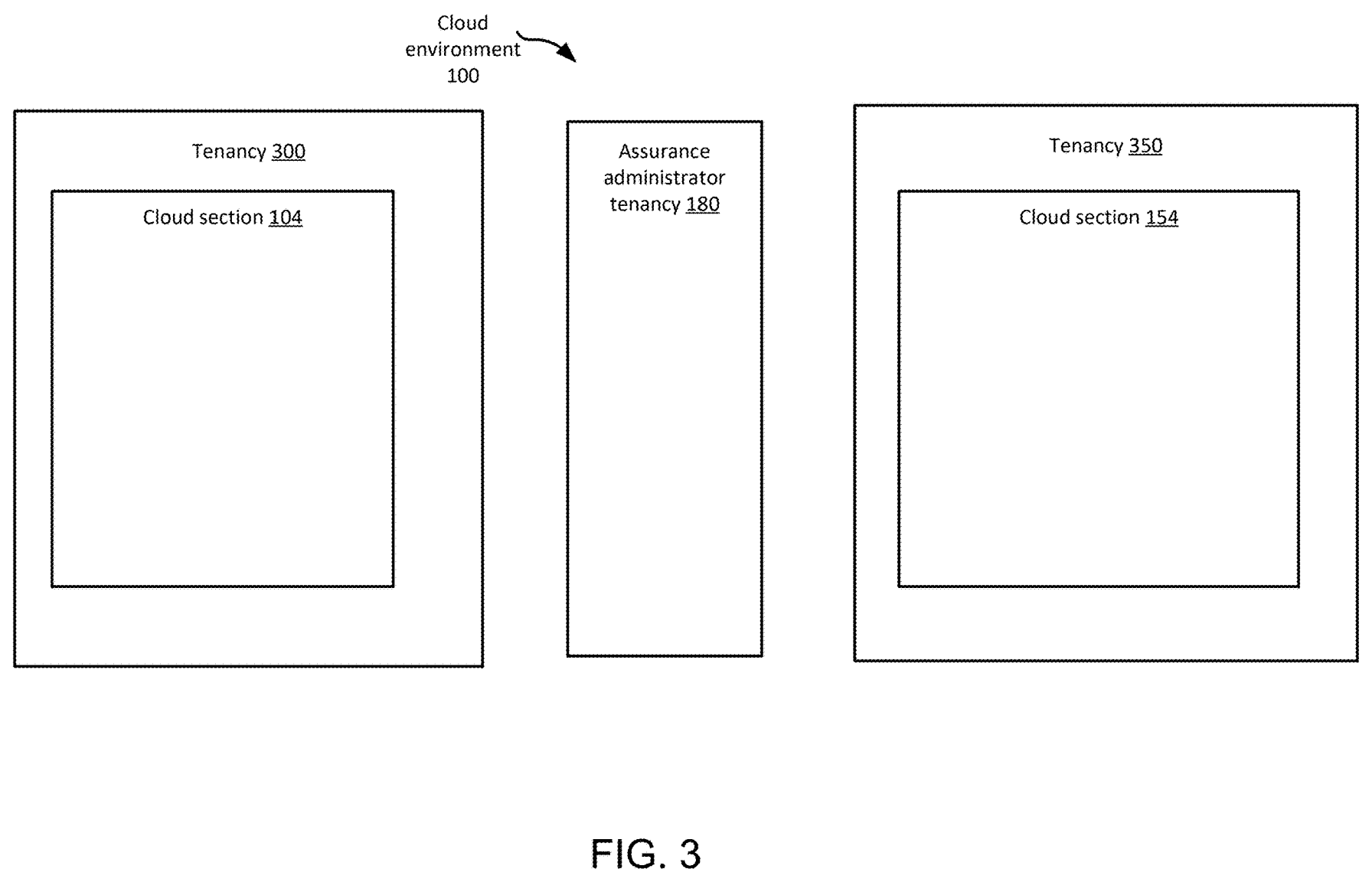

Cloud environment 100

Tenancy 300

Cloud section 104

Assurance administrator tenancy 180

Tenancy 350

Cloud section 154

FIG. 3

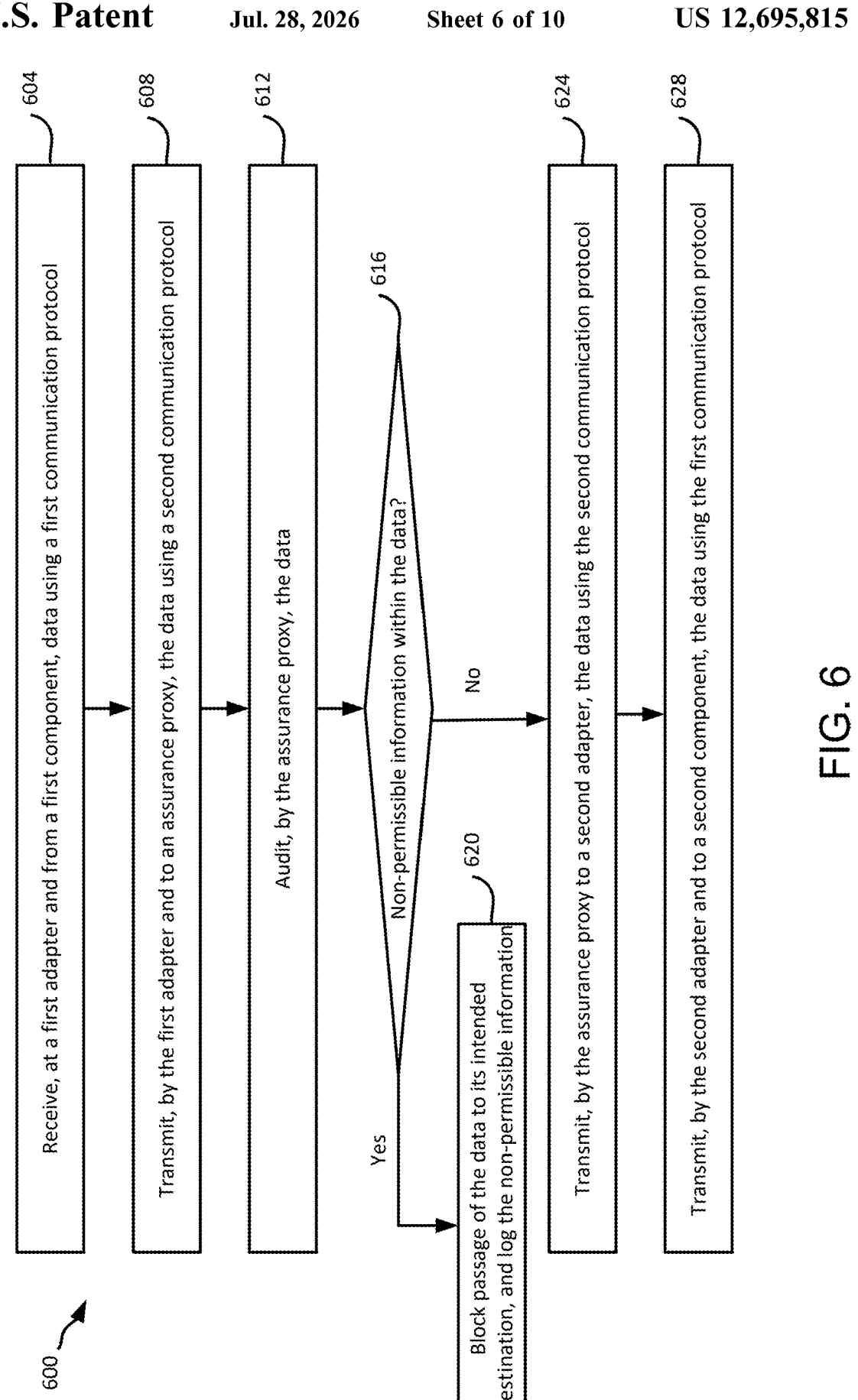

604 Receive, at a first adapter and from a first component, data using a first communication protocol 608 Transmit, by the first adapter and to an assurance proxy, the data using a second communication protocol 612 Audit, by the assurance proxy, the data 616 Non-permissible information within the data?

Yes

620 Block passage of the data to its intended destination, and log the non-permissible information No 624 Transmit, by the assurance proxy to a second adapter, the data using the second communication protocol 628 Transmit, by the second adapter and to a second component, the data using the first communication protocol

DATA COMMUNICATION PROTOCOLS FOR DATA TRANSMISSION AND SOFTWARE ASSURANCE IN A CLOUD ENVIRONMENT

BACKGROUND

A cloud provider provides on-demand, scalable computing resources (e.g., a cloud environment) to its cloud customers. A cloud customer generally desires to run its cloud resources without monitoring, scanning, or other interference by the cloud provider or other cloud customer. Therefore, the cloud provider offers "tenancies" to its cloud customers. A tenancy is an isolated partition within the cloud environment, such that resources in different tenancies are isolated from each other unless explicitly shared. Each tenancy runs a plurality of virtual machine compute instances.

BRIEF SUMMARY

In various embodiments, a non-transitory computer-readable medium includes instructions that when executed by one or more processors, cause a system including the one or more processors to perform operations including: receiving, at a first adapter and from a first component, data using a first communication protocol; and transmitting, by the first adapter and to a proxy, the data using a second communication protocol, such that the proxy audits the data and selectively (i) either blocks passage of the data or (ii) forwards the data to a second adapter using the second communication protocol, to cause the second adapter to transmit the data to a second component using the first communication protocol, wherein the first communication protocol and the second communication protocol are different, wherein the proxy is within a tenancy of a cloud environment, wherein the first adapter and the first component are within a first section of the cloud environment, wherein the second adapter and the second component are within a second section of the cloud environment, and wherein neither of the first section and the second section is within the tenancy of the cloud environment. In an example, the first section is located in a first country, and wherein the second section is located in a second country. In an example, the tenancy is a first tenancy; the first section is within a second tenancy of the cloud environment; and the second section is within (i) the second tenancy of the cloud environment or (ii) a third tenancy of the cloud environment that is different from each of the first and second tenancies. In an example, the operations further include: receiving, at the second adapter and from the proxy, the data using the second communication protocol; and transmitting, by the second adapter and to the second component, the data using the first communication protocol.

In an example, the operations further include: accessing, by the first adapter, the first component, the second adapter, and the second component, an interface description language from a protocol library. In an example, the operations further include: accessing, by the first adapter and the first component, a first interface description language from a first protocol library; and accessing, by the second adapter and the second component, a second interface description language from a second protocol library. In an example, the first adapter comprises: (i) a server for accepting a connection from the first component for the first communication protocol, and acting as a reverse proxy, and (ii) a first protocol converter for establishing a bidirectional connection with the proxy using the second communication protocol; and the first adapter comprises: (i) a client for establishing a connection with the second using the first communication protocol, and acting as a forward proxy, and (ii) a second protocol converter for establishing a bidirectional connection with the proxy using the second communication protocol.

In an example, the first communication protocol is a remote procedure calls (RPC) protocol. In an example, the first communication protocol is a gRPC (gRPC remote procedure calls) protocol. In an example, the second communication protocol is a bidirectional persistent communication protocol. In an example, the second communication protocol is a Websocket protocol.

In various embodiments, a non-transitory computer-readable medium includes instructions that when executed by one or more processors, cause a system including the one or more processors to perform operations including: receiving, at a proxy and from a first adapter, data using a first communication protocol, wherein the first adapter receives the data from a first component using a second communication protocol, and transmits the data to the proxy using the first communication protocol; auditing, at the proxy, the data to check for non-permissible information within the data; and performing one of: (i) in response to a detecting presence of the non-permissible information within the data, blocking passage of the data to its intended destination, or (ii) in response to detecting absence of the non-permissible information within the data, allowing passage of the data to a second adapter using the first communication protocol, to facilitate transmission of the data from the second adapter to a second component using the second communication protocol; wherein the first communication protocol and the second communication protocol are different, wherein the proxy is within a tenancy of a cloud environment, wherein the first adapter and the first component are within a first section of the cloud environment, wherein the second adapter and the second component are within a second section of the cloud environment, and wherein neither of the first section and the second section is within the tenancy of the cloud environment.

In an example, wherein the first section is located in a first country, wherein the second section is located in a second country, and wherein the proxy is located within (i) the first country, (ii) the second country, or (iii) a third country different from each of the first and second countries. In an example, wherein: the tenancy is a first tenancy; the first section is within a second tenancy of the cloud environment; and the second section is within (i) the second tenancy of the cloud environment or (ii) a third tenancy of the cloud environment that is different from each of the first and second tenancies. In an example, the second communication protocol is a gRPC (gRPC remote procedure calls protocol) communication protocol. In an example, the first communication protocol is a bidirectional persistent communication protocol. In an example, the first communication protocol is a Websocket protocol.

In various embodiments, a computer implemented method comprises: receiving, at a first adapter and from a first component, data using a first communication protocol; and transmitting, by the first adapter and to a proxy, the data using a second communication protocol, such that the proxy audits the data and selectively (i) either blocks passage of the data or (ii) forwards the data to a second adapter using the second communication protocol, to cause the second adapter to transmit the data to a second component using the first communication protocol, wherein the first communication protocol and the second communication protocol are different, wherein the proxy is within a tenancy of a cloud environment, wherein the first adapter and the first component are within a first section of the cloud environment, wherein the second adapter and the second component are within a second section of the cloud environment, and wherein neither of the first section and the second section is within the tenancy of the cloud environment. In an example, the first section is located in a first country, and wherein the second section is located in a second country. In an example, the tenancy is a first tenancy; the first section is within a second tenancy of the cloud environment; and the second section is within (i) the second tenancy of the cloud environment or (ii) a third tenancy of the cloud environment that is different from each of the first and second tenancies.

In some embodiments, a system is provided that includes one or more data processors and a non-transitory computer-readable storage medium containing instructions which, when executed on the one or more data processors, cause the one or more data processors to perform part or all of one or more methods disclosed herein.

In other embodiments, a computer-program product is provided that is tangibly embodied in a non-transitory machine-readable storage medium and that includes instructions configured to cause one or more data processors to perform part or all of one or more methods disclosed herein.

Cloud services, microservices, or other machine-hosted services may be offered that perform part or all of one or more methods disclosed herein. The machine-hosted services may be provided by a single machine, by a cluster of machines, or otherwise distributed across machines. The one or more machines may be configured to send and receive data, which may include instructions for performing the methods or results of performing the methods, via an application programming interface (API) or any other communication protocol.

In various embodiments, part or all of one or more methods disclosed herein may be performed by stored instructions such as a software application, computer program, or other software package installed in memory or other storage of a computing platform, such as an operating system, which provides access to physical or virtual computing resources. The operating system may provide access to physical or virtual resources of a mobile computing device, a laptop computing device, a desktop computing device, a server computing device, a container in a virtual machine on a computing device, or any other computing environment configured to execute stored instructions.

As used herein, the terms "first," "second," "third," "fourth," etc. are used as naming conventions to refer to separate items in a set of items. These naming conventions do not imply ordering unless such ordering is explicitly noted using language specific to ordering, such as "before" or "after," or unless such ordering is required to attain the expressly recited functionality, such as generating an item and later accessing the generated item.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

FIG. 3 illustrates a first section and a second section of FIG. 1 being in a first tenancy and a second tenancy, respectively, of a cloud environment.

FIG. 6 illustrates a flowchart depicting a method for conversion of communication protocols for enabling software assurance in a cloud environment, where the software assurance is performed in real or near-real time.

DETAILED DESCRIPTION

Figure 1:
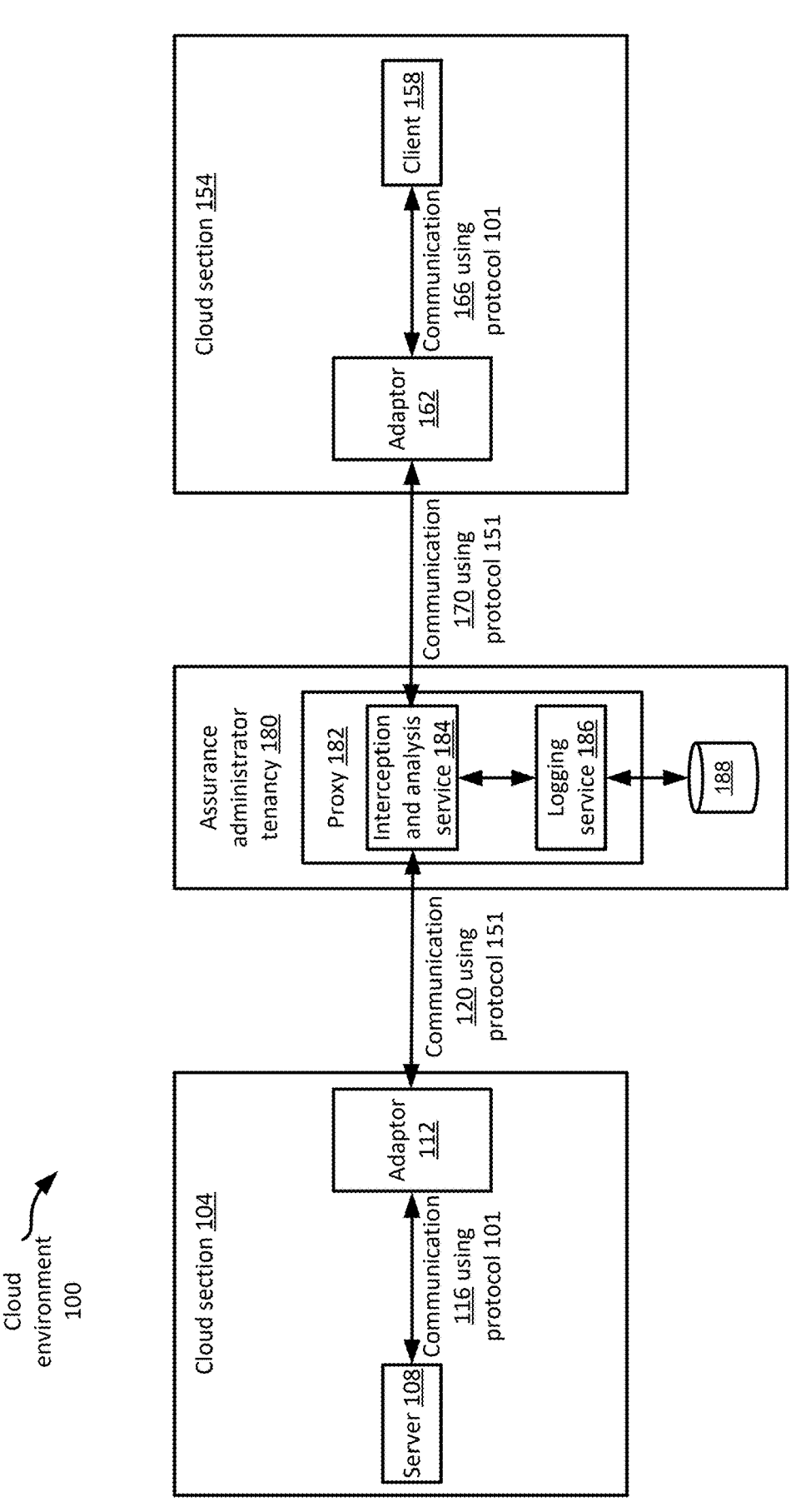
FIG. 1 illustrates a block diagram of a cloud environment comprising (i) a first cloud section, (ii) a second cloud section, and (iii) an assurance administrator tenancy, wherein data is transmitted between the first cloud section and the second cloud section through the assurance administrator tenancy, wherein the transmitted data is intercepted and audited by the assurance administrator tenancy, and wherein a protocol used for the data transmission is altered prior to the data being transmitted between the two cloud sections.

Maintaining security of a cloud environment involves controlling access to cloud resources based on permissions specified by respective cloud customers. A cloud customer can grant permissions for accessing cloud resources that it rents, but the cloud customer should not be able to grant permissions for accessing cloud resources rented by other customers. A tenancy is a conceptual bucket that holds cloud resources belonging to a particular cloud customer. An administrator of a tenancy has administrative rights to set access policies for cloud resources in the tenancy; an administrator of a tenancy does not have administrative rights to set access policies for cloud resources in another tenancy. A tenancy of a cloud customer is isolated from another tenancy of another cloud customer. A tenancy of a cloud customer includes a plurality of active cloud resources, such as compute instances that are used to host virtual machines. The cloud provider may also have control on one or more tenancies (e.g., cloud provider tenancies), through which the cloud provider may provide one or more services to the cloud customers.

A cloud provider may provide a cloud environment over a number of geographical areas. For example, a cloud environment may span across multiple cities, multiple states, multiple countries, and/or over even multiple continents. A portion of the cloud environment within a specific geographical area (such as a city, or a state, or a country) is referred to as a cloud region. Thus, the cloud environment may span a plurality of such cloud regions. A cloud region may encompass cloud resources within a city, a state, a country, or another appropriate geographical area whose boundary is defined by the cloud provider.

A "cloud section" (or simply a "section") of a cloud environment, as referred to herein, refers to a specific tenancy, a portion of a tenancy within a cloud region, or another portion of the cloud environment. Thus, in an example, a reference to a first cloud section and a second cloud section of a cloud environment may imply a first tenancy and a second tenancy, respectively, within a cloud environment. In another example, a reference to a first cloud section may imply a first portion of a tenancy, and a reference to a second cloud section may imply a second portion of the tenancy, wherein the first portion of the tenancy is within a first cloud region, and wherein the second portion of the tenancy is within a second cloud region of the cloud environment.

As described below in further detail, a cloud customer may want to transmit data between a first cloud section and a second cloud section of a cloud environment. In an example, both the first cloud section and the second cloud section of the cloud environment may be rented out to a same cloud customer (or to two different subsidiaries of the same cloud customer). As discussed, in an example, the two cloud sections may be two different tenancies rented out to the same cloud customer. In another example, the two cloud sections may be part of a same tenancy rented out to a cloud customer, but located in two different cloud regions of the cloud environment.

Generally, as the two cloud sections are rented out to the same cloud customer, the provider of the cloud environment and/or a third party may not monitor, intercept, and/or analyze the data communicated between the first cloud section and the second cloud section. However, in the cloud environment described herein, in the context of software assurance, an additional role of an assurance administrator is added into the picture. The assurance administrator may or may not be the same as the cloud provider. In an example, the assurance administrator acts as a "trusted technology provider" (TTP). It is assumed herein that the assurance administrator is the same as the cloud provider (the provider or owner of the cloud environment), although the teachings of this disclosure are not limited by such assumptions, and the assurance administrator may be different from the cloud provider.

With regard to the subject disclosure, in an example, the assurance administrator has a monitoring role over a manner in which the cloud customer is using the cloud resources. In an example, the assurance administrator may be tasked by a government regulatory agency to monitor operations of the cloud customer. As a part of such software assurance, the assurance administrator may want to intercept and/or audit the data communicated between the first cloud section and the second cloud section of the cloud customer.

For example, the first cloud section may be within a jurisdiction of a first governmental agency and the second cloud section may be within a jurisdiction of a second governmental agency, such as the first cloud section and the second cloud section being located in two different countries. Accordingly, the assurance administrator may want to ensure that the data transmitted is compliant with regulatory guidelines established by the one or both the countries.

Merely as an example, the assurance administrator may want to ensure that the data transmitted between the first cloud section and the second cloud section does not include any non-permissible information, such as malicious data, sensitive data, personally identifiable information of one or more users of one or more services offered by the cloud customer, and/or the like. For example, the assurance administrator may want to ensure that such prohibited data are not transmitted across the country boundaries. Types of data, which may be prohibited for transmission between the two cloud sections, are implementation-specific, and any examples of such prohibited data do not limit the scope of this disclosure.

In an example, accordingly, data transmission between the first section and the second section is routed through an assurance proxy within an assurance tenancy. The assurance tenancy, including the assurance proxy, is operated and maintained by personnel of the assurance administrator, in an example.

For example, the first section has a first component that wants to transmit to and/or receive data from a second component within the second section. Thus, data communication is between the first component of the first section and the second component of the second section, through the assurance proxy of the assurance administrator tenancy.

In an example, each of the first component and the second component is configured to transmit and/or receive data using a first communication protocol. The first communication protocol may be a bidirectional communication protocol, such as a remote procedure calls (RPC) protocol, e.g., the gRPC protocol. gRPC is a cross-platform protocol replying on RPC framework. gRPC was initially created by Google®, and is now open source. gRPC relies on HTTP/2 for transport and protocol buffers as an interface description language (IDL). The first communication protocol 101 may be another bidirectional communication protocol as well, in another example.

However, in an example, it may not be desirable to have the assurance proxy intercept and audit data communicated over the first communication protocol. For example, for the scenario where the first communication protocol is gRPC, the first communication protocol has to rely on the IDL stored in a protocol library (such as a protocol buffer library). Any change in the IDL may necessitate a corresponding change to the assurance proxy, e.g., such that the assurance proxy can successfully decode and analyze the intercepted data. However, the IDL may be maintained and configured by the cloud customer, to whom the first and second sections are rented out. Thus, in response to the cloud customer making changes to the IDL for the first communication protocol, corresponding changes may have to be made to the assurance proxy, in order for the assurance proxy to be compatible with the first communication protocol and in order for the assurance proxy to be able to intercept and comprehend the data transmitted using the first communication protocol. This poses an additional challenge in interpreting and analyzing the bi-directional messages flowing through the assurance proxy, due to the additional layer of complexity introduced by the IDL defined within the protocol buffer. Thus, using the first communication protocol for communicating between the first and second sections makes operation of the assurance proxy (which is maintained by the assurance administrator) dependent on any changes to the IDL made by the cloud customer. If the cloud customer changes service definitions within the IDL, then the change has to be propagated into the assurance proxy. Such dependence of the assurance proxy on the cloud customer may not be desirable.

Accordingly, as described below in further detail, although the first component of the first section and the second component of the second section may use the first communication protocol for communication, the communication between the first and second sections through the assurance proxy may be using a second communication protocol.

For example, the first section includes a first communication adaptor (also referred to as a first adaptor) and the second section includes a second communication adaptor (also referred to as a second adaptor). Communication between the first adaptor and the first component within the first section is in accordance with the first communication protocol. However, the first adapter converts the first communication protocol to the second communication protocol, prior to communicating with the assurance proxy.

Similarly, communication between the second adaptor and the second component within the second section is in accordance with the first communication protocol. However, the second adapter converts the first communication protocol to the second communication protocol, prior to communicating with the assurance proxy.

For example, when the first section wants to transmit data to the second section, the data is transmitted from the first component to the first adaptor using the first communication protocol. The first adaptor changes the received data format suitable for the first communication protocol to a data format suitable for the second communication protocol. In an example, the first adaptor then transmits the data to the assurance proxy using the second communication protocol. The assurance proxy within the assurance administrator tenancy intercepts the data, and in an example, audits the data in real or near-real time (although in another example, offline auditing of the data may also be possible). The assurance proxy may block passage of the data, e.g., if the data includes anomalous or non-permitted information. Assuming that the data does not include any such anomalous or non-permitted information, the assurance proxy redirects the data to the second adaptor using the second communication protocol. The second adaptor converts the received data (e.g., received from the assurance proxy) format suitable for the second communication protocol to a data format suitable for the first communication protocol. The second adaptor then transmits the data to the second component using the first communication protocol. As will be described below in further detail, each of the first and second adaptors includes a gRPC server or a gRPC client (e.g., if the first communication protocol is gRPC), and a protocol converter.

In an example, the cloud environment further includes a protocol library including IDL usable for the first communication protocol, as described below in further detail. In an example, the protocol library may be centralized (such that both the first section and the second section may access the same protocol library, see FIG. 4 for example). In another example, the protocol library may be decentralized (such that the first section and the second section may access a first protocol library and a second protocol library, respectively, see FIG. 5 for example).

Further details of data communication between the first component and the second component of the first section and the second section, respectively, are described below.

FIG. 1 illustrates a block diagram of a cloud environment 100 comprising (i) a first cloud section 104 (also henceforth referred to herein as a section 104), (ii) a second cloud section 154 (also henceforth referred to herein as a section 154), and (iii) an assurance administrator tenancy 180, wherein data is transmitted between the first cloud section 104 and the second cloud section 154 through the assurance administrator tenancy 180, wherein the transmitted data is intercepted and audited by the assurance administrator tenancy 180, and wherein a protocol used for the data transmission is altered prior to the data being transmitted between the two cloud sections 104, 154.

Figure 2:
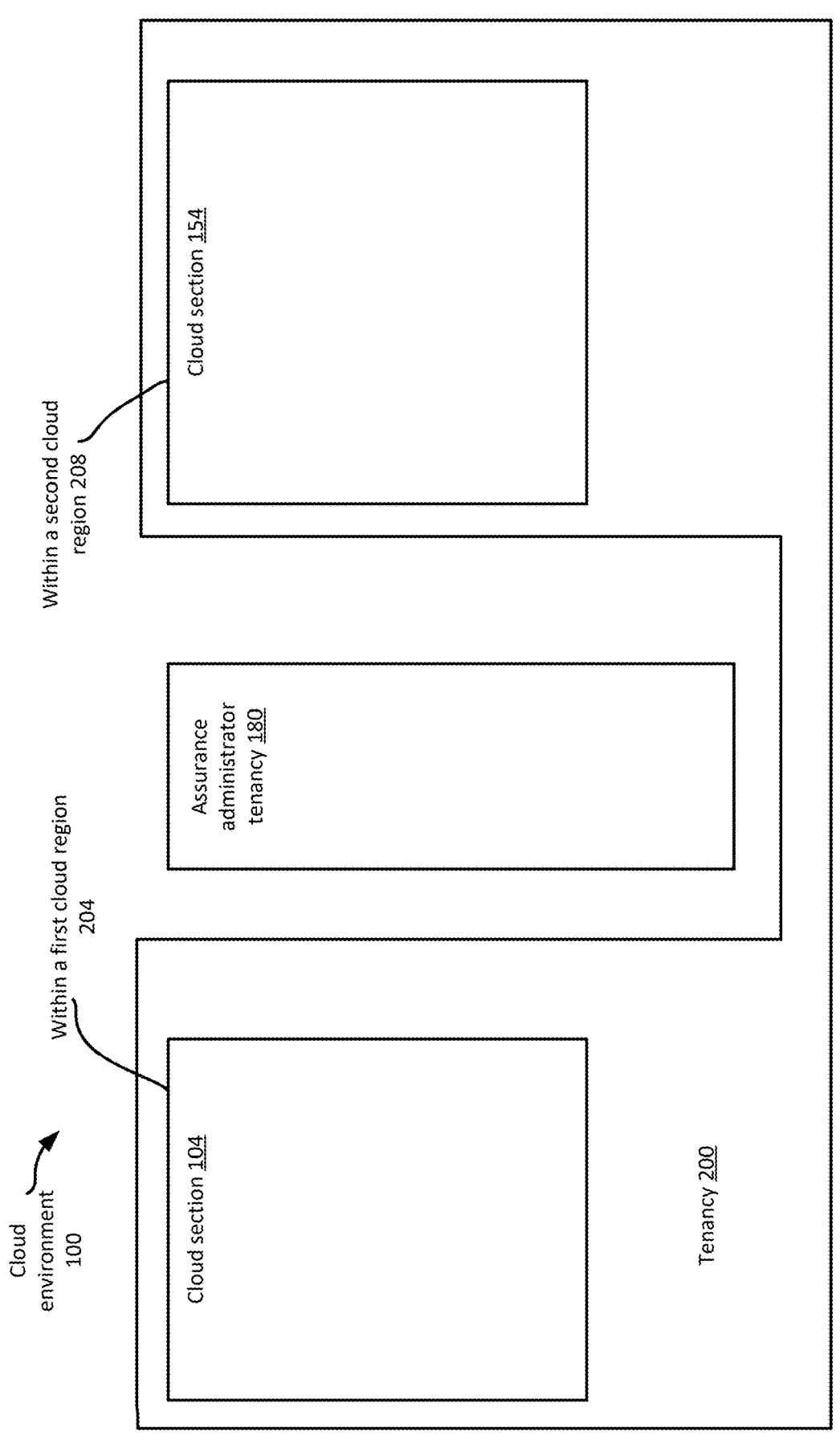
FIG. 2 illustrates a first section and a second section of FIG. 1 being in a same customer tenancy, but in two different cloud regions of a cloud environment.

As described above, in an example, each of the sections 104, 154 may represent a respective tenancy, or a portion of a tenancy. For example, FIG. 2 illustrates a first section 104 and a second section 154 of FIG. 1 being in a same customer tenancy 200, but in two different cloud regions 204 and 208 of a cloud environment 100. For example, the cloud region 204 including the section 104 and the cloud region 208 including the section 154 may be geographically apart from each other, e.g., in two different cities, in two different states, in two different countries, or even in two different continents.

FIG. 3 illustrates a first section 104 and a second section 154 of FIG. 1 being in a first tenancy 300 and a second tenancy 350, respectively, of the cloud environment 100. Thus, in this example, the two sections 104 and 154 are in two different tenancies 300 and 350. In an example, the two tenancy 300 and 350 may be rented out to a same cloud customer. In an example, the tenancies 300 and 350 may be geographically apart from each other, e.g., in two different cities, in two different states, in two different countries, or even in two different continents, although in another example the two tenancies 300 and 350 may be geographically collocated.

For the example of FIGS. 2 and/or 3, the assurance administrator tenancy 180 (such as an assurance proxy 182 within the assurance administrator tenancy 180) may be located proximal to the section 104 (such as within a same cloud region as the section 104), or may be located proximal to the section 154 (such as within a same cloud region as the section 154), or may not be located proximal to either of the sections 104, 154 (such as within a cloud region that is different from the cloud region including the section 104 and/or different from the cloud region including the section 104). The location of the assurance tenancy 180 relative to the sections 104, 154 is implementation specific, and may vary from one implementation to the next.

Referring again to FIG. 1, in an example, the two sections 104, 154 may be rented out by the provider of the cloud environment 100 to a same cloud customer (or to two different subsidiaries of the same cloud customer). The two sections 104 and 154 communicate and transmit data (such as messages) between among themselves, via the assurance administrator tenancy 180. As also described above, generally, the provider of the cloud environment and/or a third party may not intercept and/or analyze the data communicated between the sections 104, 154. However, in the cloud environment 100, in the context of software assurance, an additional role of the assurance administrator is added into the picture. The assurance administrator may or may not be the same as the cloud provider. In an example, the assurance administrator acts as trusted technology provider (TTP). In an example, the assurance administrator has a monitoring role over data transmission between the two sections 104, 154. In an example, the assurance administrator may be tasked by a government regulatory agency and/or by another third party to monitor operations of the cloud customer.

As a part of such software assurance, the assurance administrator may want to intercept and/or audit the data communicated between the sections 104, 154. For example, the section 104 may be within a jurisdiction of a first governmental agency (e.g., located in a first country) and the second cloud section 154 may be within a jurisdiction of a second governmental agency (e.g., located in a first country). Accordingly, the assurance administrator may want to ensure that the data transmitted is compliant with regulatory guidelines established by the one or both the governmental agencies. In yet another example, both the sections 104, 154 may be within a jurisdiction of a same governmental agency (e.g., both sections located in a same country), and the assurance administrator may want to ensure that the data transmitted between the two sections is compliant with regulatory guidelines established by that governmental agency.

Merely as an example, the assurance administrator may want to ensure that the data transmitted between the first cloud section and the second cloud section does not include malicious data, sensitive data, personally identifiable information of one or more users of one or more services offered by the cloud customer, and/or the like. For example, the assurance administrator may want to ensure that such prohibited or non-permissible data are not transmitted across section boundaries (such as across country boundaries).

Accordingly, the assurance administrator tenancy 180 (e.g., which is operated by personnel of the assurance administrator) includes a proxy 182, which receives data from the section 104 and transmits to the section 154, and/or receives data from the section 154 and transmits to the section 104. Thus, the proxy 182 of the assurance administrator tenancy 180 intercepts and audits data transmitted between the sections 104, 154.

In an example, proxy 182 of the assurance administrator tenancy 180 includes an interception and analysis service 184 configured to intercept the data transmitted between the sections 104, 154, and to audit or analyze the data. In an example, any anomaly (such as presence of on-permissible data) detected by the interception and analysis service 184 is passed to a logging service 186 within the proxy 182 of the assurance administrator tenancy 180 (although the logging service 186 may be external to the proxy 182, and within the assurance administrator tenancy 180). The logging service 186 logs anomalous data to a storage repository 188.

In an example, the interception and analysis service 184 performs audit of the data in real or near-real time. For example, when data from section 104 is received by the proxy 182, the interception and analysis service 184 audits the data. If any anomalous issues are detected, the interception and analysis service 184 passes such anomaly information to the logging service 186 for logging in the storage repository 188. Additionally (or alternatively), the interception and analysis service 184 may block passage of the data to its intended destination, in an example.

Thus, in one example, upon detection of an anomalous issue, the interception and analysis service 184 may perform one or both of (i) causing to log the anomalous issue and the corresponding data in the storage repository 188, and/or (ii) block passage of the data to its intended destination.

On the other hand, if no anomalous issues are detected, the data is allowed passage to its intended destination, within logging of the data.

Although in one example the interception and analysis service 184 performs audit of the data in real or near-real time, in another example, the interception and analysis service 184 performs audit of the data offline, e.g., after the data has been allowed passage to its intended target. Thus, in such examples, passage of data including non-permissible information cannot be blocked, but the anomaly may be detected and logged by the interception and analysis service 184.

The interception and analysis service 184 may use any suitable tool(s) to audit the data in real or near-real time (or in non-real time or offline) and detect possible anomalous issues, such as rule-based or heuristic algorithms configured to detect anomalous issues, one or more artificial intelligence and/or machine learning (ML) based models trained to detect anomalous issues, etc.

Examples of anomalous issues (such as non-permissible information) that the interception and analysis service 184 looks for include, for example, possibly malicious data, sensitive data, personally identifiable information of one or more users of one or more services offered by the cloud customer, and/or the like. Such a list is not exhaustive, and may be implementation specific, and does not limit the scope of this disclosure. Similarly, tools used for the detection within the interception and analysis service 184 may also be implementation specific, and does not limit the scope of this disclosure.

In an example, the section 104 comprises a server 108, and the section 154 comprises a client 158. Note that the role of the server 108 and the client 158 are mere examples, and in another example, the roles may be reverse (e.g., the server 108 can act as a client and the client 158 can act as a server) while communicating data between the sections 104, 154. The data communication occurs between the server 108 and the client 158.

In an example, to enable the data communication, the section 104 comprises an adaptor 112, and the section 154 comprises an adaptor 162. The adaptors 112, 162, among other things, alter a data communication protocol.

Communications between various components of FIG. 1 are labelled using corresponding labels (such as communication 116, communication 120, etc.). Note that such communications 116, 120, 166, 170 may be for transmission of at least in part the same data (e.g., unless at least a part of the data is blocked by the interception and analysis service 184). However, transmission or communication of the data between different components are labelled differently, for purposes of better identification.

In an example, the server 108 and the client 158 communicate using a first communication protocol 101. For example, the server 108 transmits data and receives data (labelled as communication 116 in FIG. 1) using the first communication protocol 101. Similarly, the client 158 transmits data and receives data (labelled as communication 166 in FIG. 1) using the first communication protocol 101.

The first communication protocol 101 is a bidirectional communication protocol, in which data can be communicated in two ways (such as data transmitted from the server 108, and data transmitted to the server 108; or data transmitted from the client 158, and data transmitted to the client 158).

An example of the first communication protocol 101 is the remote procedure calls (RPC) protocol, such as the gRPC protocol. gRPC is a cross-platform protocol replying on remote procedure call (RPC) framework. gRPC was initially created by Google®, and is now open source. gRPC relies on HTTP/2 for transport and protocol buffers as an interface description language (IDL). gRPC provides features such as authentication, bidirectional streaming and flow control, blocking or nonblocking bindings, and/or cancellation and timeouts. The first communication protocol 101 may be another bidirectional communication protocol as well, in another example.

However, in an example, it may not be desirable to have the assurance proxy 182 intercept and audit data communicated over the first communication protocol 101. For example, for the scenario where the first communication protocol 101 is gRPC, the first communication protocol 101 has to rely on IDL stored in a protocol library (such as a protocol buffer library). Any change in the IDL may necessitate corresponding changes to the proxy 182. However, the IDL may be maintained and configured by the cloud customer, to whom the sections 104 and 154 are rented out. Thus, in response to the cloud customer making changes to the IDL for the first communication protocol 101, corresponding changes may have to be made to the proxy 182, in order for the proxy 182 to be compatible with the first communication protocol 101 and in order for the proxy 182 to be able to intercept and analyze the data transmitted using the first communication protocol 101. This poses an additional challenge in interpreting and analyzing the bi-directional messages flowing through the assurance proxy 182, due to the additional layer of complexity introduced by the IDL defined within the protocol buffer. Thus, using the first communication protocol 101 for communicating between the sections 104, 154 makes operation of the assurance proxy 182 (which is maintained by the assurance administrator) dependent on any changes to the IDL made by the cloud customer. If the cloud customer changes service definitions within the IDL, then the change has to be propagated into the assurance proxy 182. Such dependence of the assurance proxy 182 on the cloud customer may not be desirable.

Accordingly, as illustrated in FIG. 1, although the server 108 and/or the client 158 may use the first communication protocol 101 for communication, the communication between the sections 104 and 154 may be using a second communication protocol 151.

For example, the section 104 includes a communication adaptor 112 (also referred to as an adaptor 112) and the section 154 includes a communication adaptor 162 (also referred to as an adaptor 162). The adaptor 112 converts the communication protocol 101 to the communication protocol 151. Similarly, the adaptor 162 converts the communication protocol 101 to the communication protocol 151. Accordingly, communication between the adaptors 112, 162 occurs through the assurance administrator tenancy 180 and using the communication protocol 151.

For example, when the section 154 wants to transmit data to the section 104, the data is transmitted from the client 158 to the adaptor 162 using communication protocol 101 (labelled as communication 166 in FIG. 1). The adaptor 162 changes the received data format suitable for the communication protocol 101 to a data format suitable for the communication protocol 151. In an example, the adaptor 162 then transmits the data to the assurance administrator tenancy 180 using the communication protocol 151 (labelled as communication 170 in FIG. 1).

The proxy 182 within the assurance administrator tenancy 180 intercepts the data, and in an example, audits the data in real or near-real time (although in another example, offline auditing of the data may also be possible). The proxy 182 may block passage of the data, e.g., if the data includes anomalous or non-permitted information. Assuming that the data does not include any such anomalous or non-permitted information, the proxy 182 redirects the data to the adaptor 112 using the communication protocol 151 (labelled as communication 120 in FIG. 1).

The adaptor 112 converts the received data format suitable for the communication protocol 151 to a data format suitable for the communication protocol 101. The adaptor 112 then transmits the data to the server 108 using the communication protocol 101 (labelled as communication 1116 in FIG. 1).

Thus, in an example, each of the adaptors 112, 162 act as a proxy. In an example where the communication protocol 101 is gRPC, the adaptor 162 interprets and transmits the gRPC data (e.g., to and/or from the client 158) reliably over the non-gRPC channel to and/or from the adaptor 112. Similarly, the adaptor 112 interprets and transmits the gRPC data (e.g., to and/or from the server 108) reliably over the non-gRPC channel to and/or from the adaptor 162.

Figure 4:
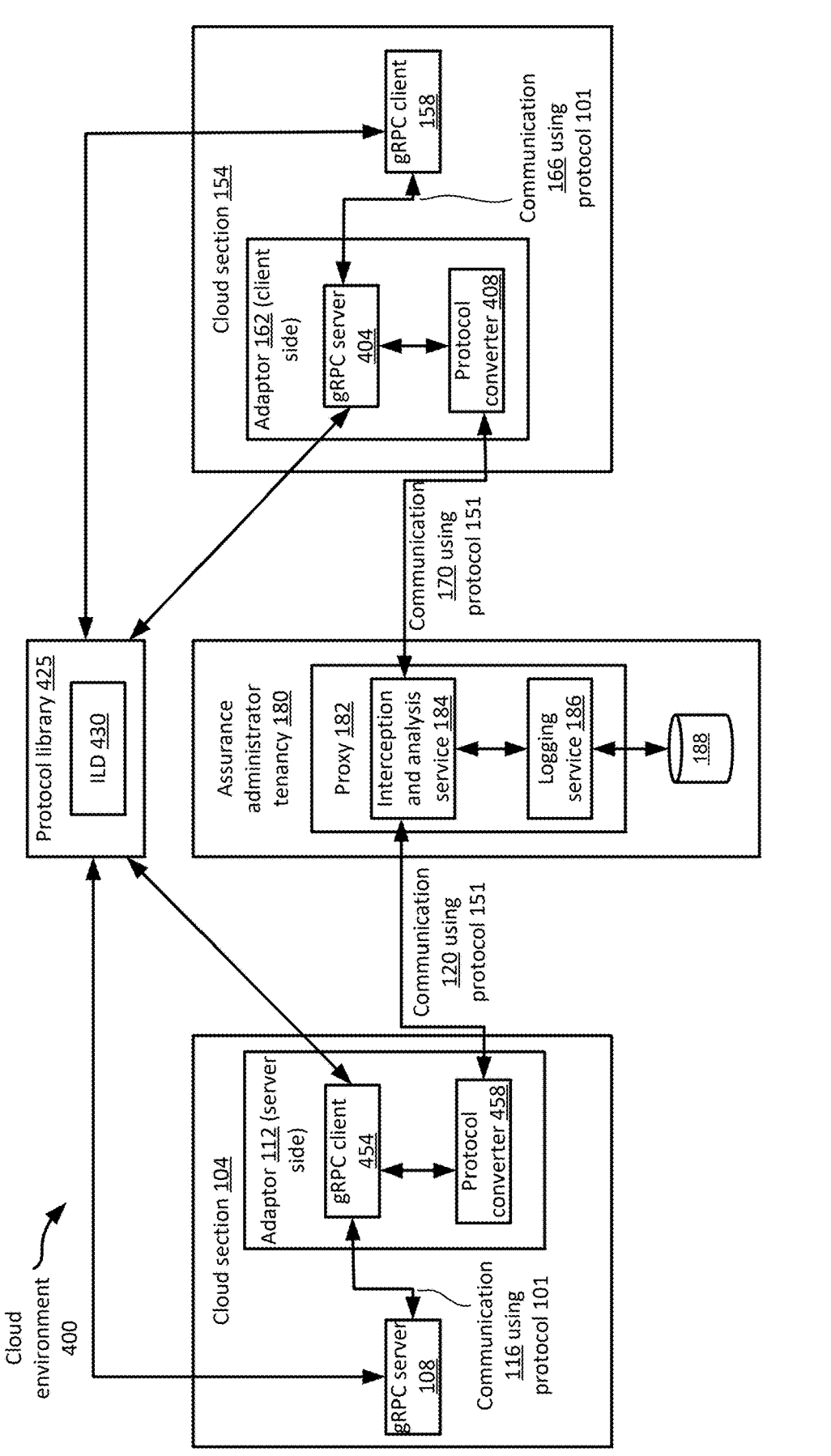
FIG. 4 illustrates a block diagram of a cloud environment comprising (i) a first cloud section comprising a first communication adaptor including a protocol converter, (ii) a second cloud section comprising a second communication adaptor including another protocol converter, (iii) an assurance administrator tenancy, wherein data is transmitted between the first cloud section and the second cloud section through the assurance administrator tenancy, wherein the transmitted data is intercepted and audited by the assurance administrator tenancy, and wherein a communication protocol used for the data transmission is altered prior to the data being transmitted to and/or from the assurance administrator tenancy.

FIG. 4 illustrates a block diagram of a cloud environment 400 comprising (i) a first cloud section 104 comprising a first communication adaptor 112 including a protocol converter 458, (ii) a second cloud section 154 comprising a second communication adaptor 162 including another protocol converter 408, (iii) an assurance administrator tenancy 180, wherein data is transmitted between the first cloud section 104 and the second cloud section 154 through the assurance administrator tenancy 180, wherein the transmitted data is intercepted and audited by the assurance administrator tenancy 180, and wherein a communication protocol used for the data transmission is altered prior to the data being transmitted to and/or from the assurance administrator tenancy. Thus, the cloud environment 400 of FIG. 4 is an example implementation of the cloud environment 100 of FIG. 1. Accordingly, like components in the cloud environments 100 and 400 of FIGS. 1 and 4, respectively, are labelled using the same labels.

In the example of FIG. 4, it is assumed that the communication protocol 101 is gRPC, although the communication protocol 101 may be another type of bidirectional communication protocol in another example.

As illustrated in FIG. 4, the adaptor 162 is within the cloud section 154 including the gRPC client 158, and is referred to as a client-side adaptor. The adaptor 112 is within the cloud section 104 including the gRPC server 108, and is referred to as a server-side adaptor.

The adaptor 162 comprises a gRPC server 404, which accepts gRPC connections from the gRPC client 158. In an example, the gRPC server 404 acts as a reverse proxy. For example, the gRPC server 404 communicates with the gRPC client 158 in accordance with the gRPC protocol.

In an example, the adaptor 162 further comprises a protocol converter 408. The protocol converter 408 establishes a bidirectional connection with the assurance proxy 182 using the second communication protocol 151. The protocol converter 408 acts as a protocol specific client, e.g., to establish the bi-directional connection (such as a bi-direction persistent connection) with the assurance proxy 182 over the second communication protocol 151.

The adaptor 112 comprises a gRPC client 454, which establishes gRPC connection from the gRPC server 108. In an example, the gRPC client 454 acts as a forward proxy. For example, the gRPC server 108 communicates with the gRPC client 454 in accordance with the gRPC protocol.

In an example, the adaptor 112 further comprises a protocol converter 458. The protocol converter 458 accepts a bidirectional connection from the assurance proxy 182 using the second communication protocol 151. The protocol converter 408 acts as a protocol specific client, e.g., to accept the bi-directional connection (such as a bi-direction persistent connection) with the assurance proxy 182 over the second communication protocol 151.

Although not illustrated in FIG. 4, one or more of the gRPC server 108, the gRPC client 454, gRPC server 404, and the gRPC client 158 comprises corresponding internal buffers, e.g., to manage the connection state of the corresponding gRPC connections.

In an example, a gRPC connection is based on corresponding IDL. For example, when a gRPC client and a gRPC server communicates with each other over the gRPC protocol, both the gRPC client and the gRPC server have access to common IDL, using which the compilers of the server and the client operate. Accordingly, the cloud environment 400 comprises a protocol library 425 storing the IDL 430, which may be accessed by the gRPC server 108, the gRPC client 454, the gRPC server 404, and the gRPC client 158.

Any change in the IDL 430 is received by each of the gRPC server 108, the gRPC client 454, the gRPC server 404, and the gRPC client 158, such that each of the gRPC server 108, the gRPC client 454, gRPC server 404, and the gRPC client 158 updates the corresponding gRPC communication. However, as the assurance proxy 182 does not communicate using the gRPC protocol, the assurance proxy 182 does not need access to the protocol library 425. Accordingly, in an example, the protocol library 425 is managed by the cloud customer to whom the sections 104, 154 are rented, and operations of the assurance administrator is not based on the IDL 430 stored within the protocol library 425.

In an example, the protocol library 425 may be implemented in a protocol buffer, such as using one or more storage repositories. The protocol library 425 may be stored within the cloud environment 400, such as within a service tenancy rented out to the cloud customer, in a service tenancy managed by the cloud provider and/or the assurance administrator, within the section 104, within the section 154, and/or another appropriate location accessible to the cloud sections 104, 154.

Figure 5:
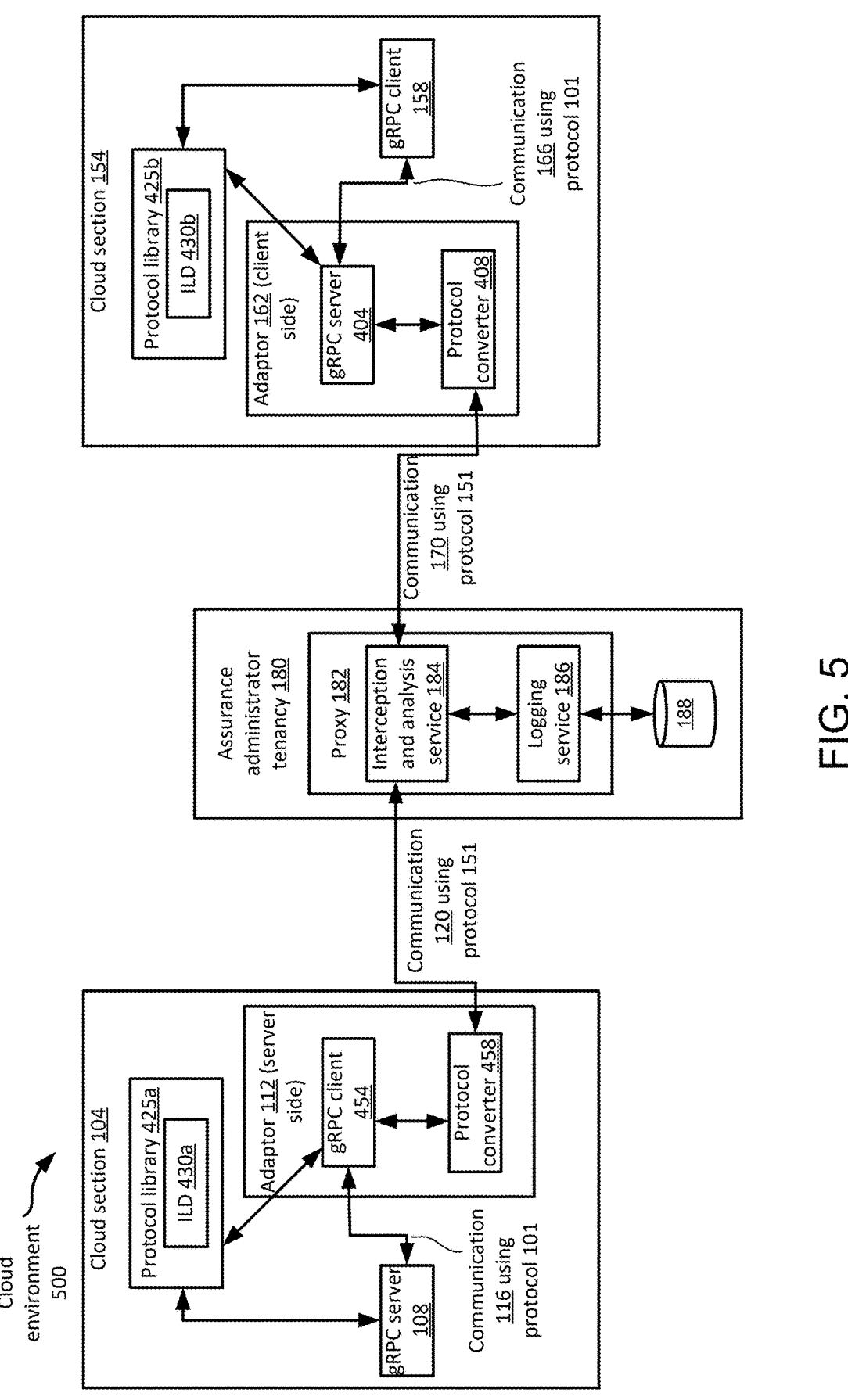
FIG. 5 illustrates a block diagram of a cloud environment comprising (i) a first cloud section comprising a first communication adaptor including a protocol converter, (ii) a second cloud section comprising a second communication adaptor including another protocol converter, (iii) an assurance administrator tenancy, wherein data is transmitted between the first cloud section and the second cloud section through the assurance administrator tenancy, wherein the transmitted data is intercepted and audited by the assurance administrator tenancy, wherein a communication protocol used for the data transmission is altered prior to the data being transmitted between the two sections, wherein the first cloud section has access to a first protocol library storing interface description language (IDL) for gRPC communication within the first cloud section, and wherein the second cloud section has access to a second protocol library storing IDL for gRPC communication within the second cloud section.

In FIG. 4, the protocol library 425 is a centralized protocol library shared among the sections 104, 154. However, in another example, the protocol library 425 may be implemented in a decentralized manner. FIG. 5 illustrates a block diagram of a cloud environment 500 comprising (i) a first cloud section 104 comprising a first communication adaptor 112 including a protocol converter 458, (ii) a second cloud section 154 comprising a second communication adaptor 162 including another protocol converter 408, (iii) an assurance administrator tenancy 180, wherein data is transmitted between the first cloud section 104 and the second cloud section 154 through the assurance administrator tenancy 180, wherein the transmitted data is intercepted and audited by the assurance administrator tenancy 180, wherein a communication protocol used for the data transmission is altered prior to the data being transmitted between the two sections 104, 154, wherein the first cloud section 104 has access to a first protocol library 425a storing interface description language (IDL) 430a for gRPC communication within the first cloud section 104, and wherein the second cloud section 104 has access to a second protocol library 425b storing IDL 430b for gRPC communication within the second cloud section 104.

Thus, unlike the cloud environment 400 of FIG. 4 in which a centralized protocol library 425 was shared among the sections 104, 154, in FIG. 5, the cloud environment 500 comprises (i) the protocol library 425a within or at least accessible to the section 104, and (ii) the protocol library 425b within or at least accessible to the section 154. The IDLs 430a, 430b may be the same, although in another example, different versions of the IDLs may be used for the protocol libraries 425a and 425b.

Referring to FIGS. 4 and 5, in an example, the communication protocol 151 used for the communications 120 and 170 (e.g., between the protocol converters 458 and 408, via the assurance proxy 182) may be a suitable bi-directional communication protocol, such as a bi-directional persistent communication protocol. In an example, the communication protocol 151 may be Websocket communication protocol. WebSocket provides a simultaneous bi-directional communication channel, e.g., over a single Transmission Control Protocol (TCP) connection. The WebSocket protocol enables full-duplex interaction between a client and a server, with lower overhead than half-duplex alternatives such as HTTP polling. This facilitates a real-time or near-real time data transfer from and to the server. In an example, the assurance proxy 182 is configured to intercept the data transmitted using the Websocket connection, and analysis and/or audit such data using the interception and analysis service 184, as also described above.

FIG. 6 illustrates a flowchart depicting a method 600 for conversion of communication protocols for enabling software assurance in a cloud environment, where the software assurance is performed in real or near-real time. Various operations of the method 600 may be performed by one or more elements described above with respect to FIGS. 1-5.

At 604, data is received at a first adapter and from a first component, e.g., using a first communication protocol. For example, as illustrated in FIGS. 1, 4, and 5, the adapter 162 receives the data from the client 158 using the communication protocol 101 (which may be the gRPC protocol in an example).

At 608, the data is transmitted by the first adapter and to an assurance proxy using a second communication protocol. For example, the adapter 162 transmits the data to the assurance proxy 182 using the communication protocol 151 (which may be the Websocket protocol in an example).

At 612, the assurance proxy audits the data, e.g., in real time or near-real time. For example, the interception and analysis service 184 of the assurance proxy 182 audits the data, as described above.

At 616, the assurance proxy (such as the interception and analysis service 184) checks the data to determine if non-permissible information is present within the data. Example of non-permissible information includes any information that is prohibited by the assurance administrator from transmission between the sections 104 and 154, such as malicious data, sensitive data, personally identifiable information of one or more users of one or more services offered by the cloud customer, and/or the like.

If "Yes" at 616 (e.g., non-permissible information is included within the data), the method 600 proceeds from 616 to 620, where the assurance proxy blocks passage of the data to its intended destination. Additionally (or alternatively), the assurance proxy (e.g., the logging service 186) logs the non-permissible information (e.g., within the storage repository 188).

On the other hand, if "No" at 616 (e.g., non-permissible information is not detected within the data), the method 600 proceeds from 616 to 624, where the assurance proxy transmits the data to a second adapter using the second communication protocol. For example, the assurance proxy transmits the data to the adapter 112.

At 628, the second adapter transmits the data to a second component using the first communication protocol. For example, the adapter 112 transmits the data to the server 108 using the communication protocol 101.

Figure 7:
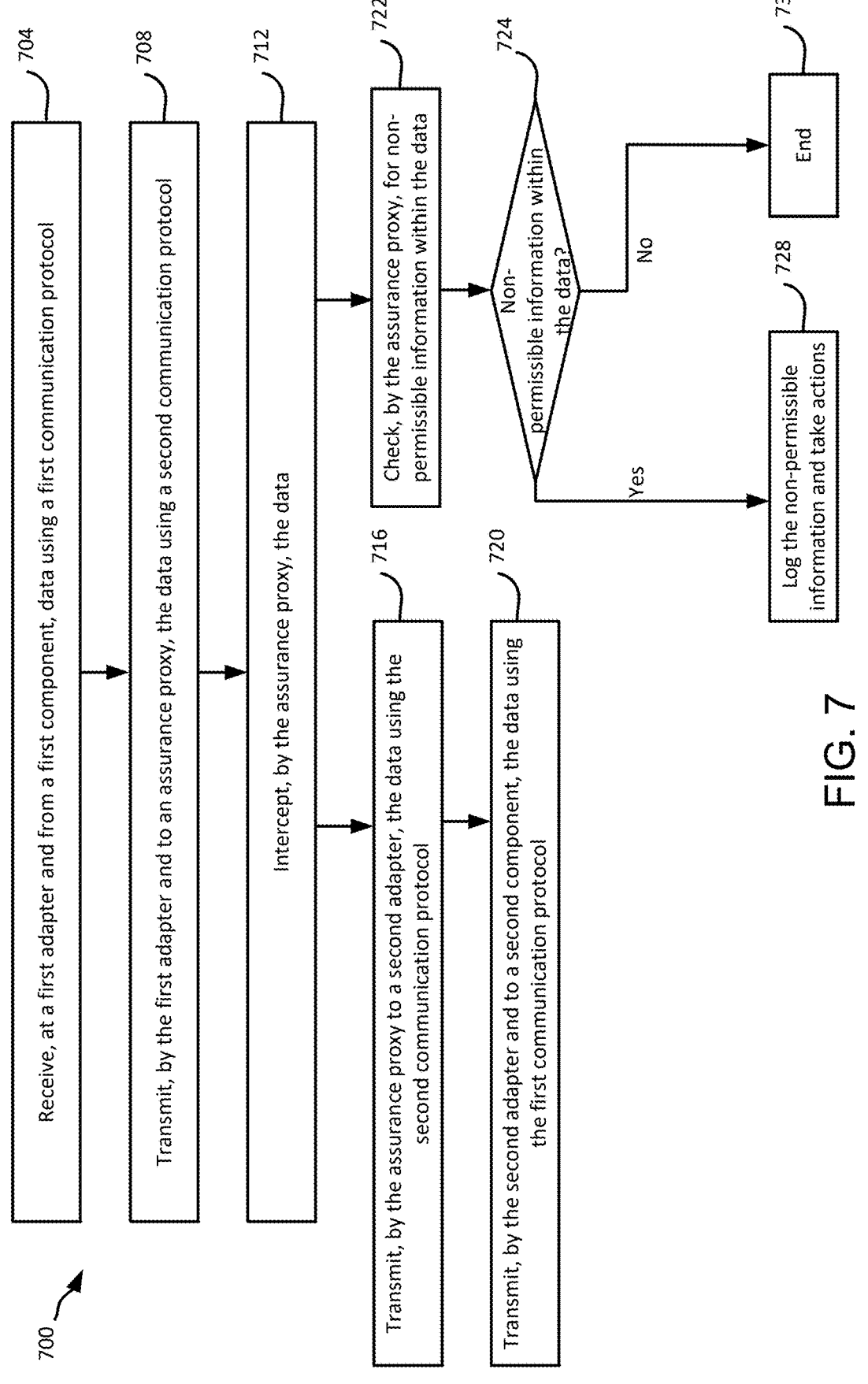
FIG. 7 illustrates a flowchart depicting a method for conversion of communication protocols for enabling software assurance in a cloud environment, where the software assurance is performed offline (e.g., not in real or near-real time).

FIG. 7 illustrates a flowchart depicting a method 700 for conversion of communication protocols for enabling software assurance in a cloud environment, where the software assurance is performed offline (e.g., not in real or near-real time). Various operations of the method 700 may be performed by one or more elements described above with respect to FIGS. 1-5.

At 704, data is received at a first adapter and from a first component, e.g., using a first communication protocol. For example, as illustrated in FIGS. 1, 4, and 5, the adapter 162 receives the data from the client 158 using the communication protocol 101 (which may be the gRPC protocol in an example).

At 708, the data is transmitted by the first adapter and to an assurance proxy using a second communication protocol. For example, the adapter 162 transmits the data to the assurance proxy 182 using the communication protocol 151 (which may be the Websocket protocol in an example).

At 712, the assurance proxy intercepts the data, e.g., for offline auditing and analysis of the data.

The method 700 proceeds from 712 to 716 in real or near-real time, and also proceeds from 712 to 722 in an asynchronous manner (e.g., in an offline manner, such that operations at 722 may be performed immediately after, or after elapse of a period of time from the operations at 712).

At 716, the assurance proxy transmits the data to a second adapter using the second communication protocol. For example, the assurance proxy transmits the data to the adapter 112. Thus, irrespective of whether the data has non-permissible information or not, the assurance proxy transmits the data to the second adapter (e.g., because the analysis of the data at the assurance proxy 182 is performed in non-real time and offline).

At 720, the second adapter transmits the data to a second component using the first communication protocol. For example, the adapter 112 transmits the data to the server 108 using the communication protocol 101.

Also, as described above, the method 700 also proceeds from 712 to 722. At 722, the assurance proxy checks for non-permissible information within the data. Examples of non-permissible information have been described above in detail. At 724, a decision is made by the assurance proxy as to whether non-permissible information is present within the data.

If "Yes" at 724 (e.g., non-permissible information is included within the data), the method 700 proceeds from 724 to 728, where the assurance proxy (e.g., the logging service 186) logs the non-permissible information (e.g., within the storage repository 188). Additionally (or alternatively), actions may be taken against the cloud customer (such as undertaking punitive actions, or informing the cloud customer regarding violation in the data transfer between the sections 104, 154, etc.). The nature of the actions may be implementation specific, and may vary from one embodiment to the next. On the other hand, if "No" at 724 (e.g., non-permissible information is not included within the data), the method 700 ends at 732.

Computer System Architecture

Figure 8:
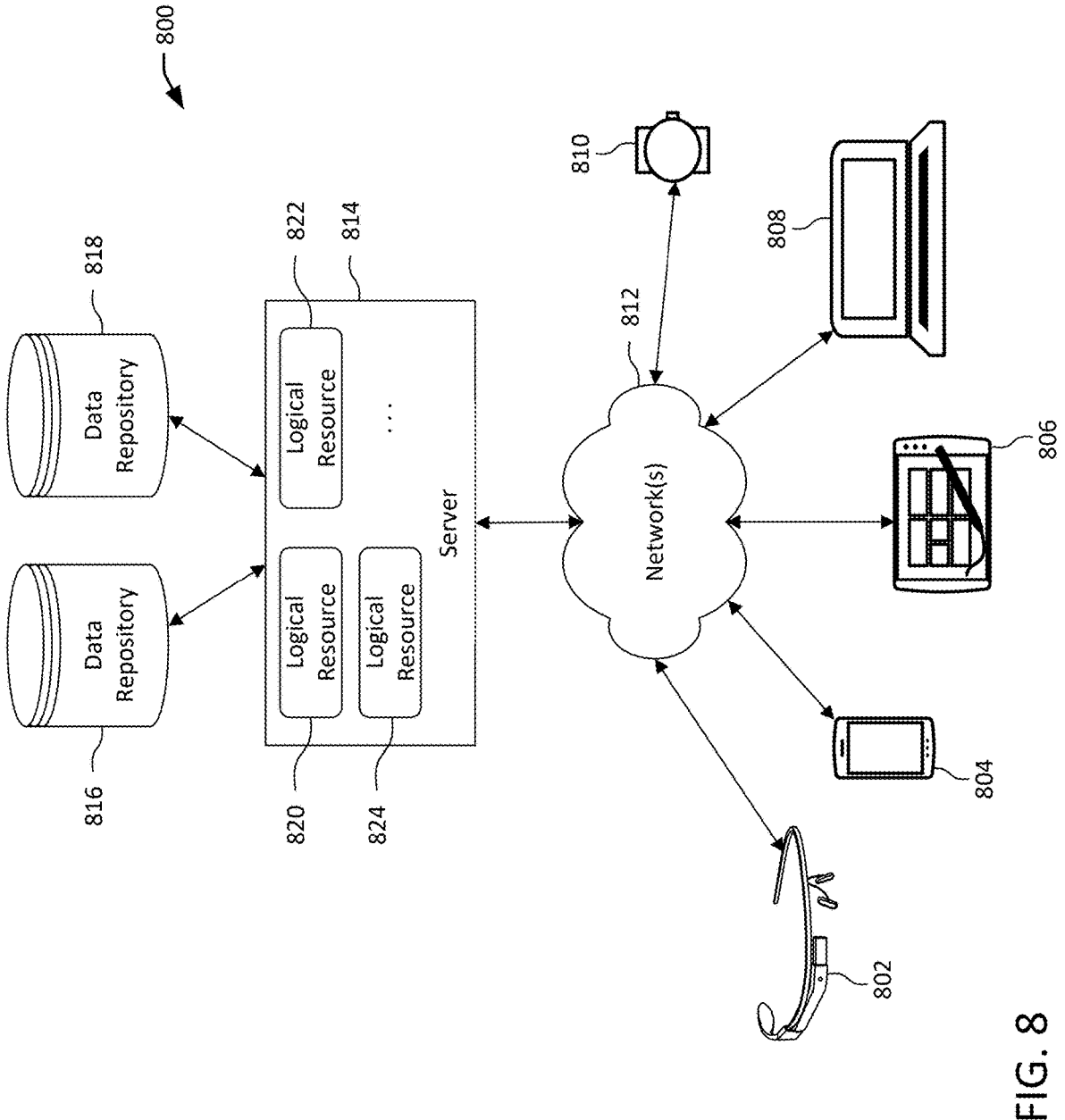
FIG. 8 depicts a simplified diagram of a distributed system for implementing certain aspects.

FIG. 8 depicts a simplified diagram of a distributed system 800 for implementing an embodiment. In the illustrated embodiment, distributed system 800 includes one or more client computing devices 802, 804, 806, 808, and/or 810 coupled to a server 814 via one or more communication networks 812. Clients computing devices 802, 804, 806, 808, and/or 810 may be configured to execute one or more applications.

In various aspects, server 814 may be adapted to run one or more services or software applications that enable techniques for enabling software assurance in a cloud environment using conversion of data transmission protocols. In certain aspects, server 814 may also provide other services or software applications that can include non-virtual and virtual environments. In some aspects, these services may be offered as web-based or cloud services, such as under a Software as a Service (SaaS) model to the users of client computing devices 802, 804, 806, 808, and/or 810. Users operating client computing devices 802, 804, 806, 808, and/or 810 may in turn utilize one or more client applications to interact with server 814 to utilize the services provided by these components.

In the configuration depicted in FIG. 8, server 814 may include one or more components 820, 822 and 824 that implement the functions performed by server 814. These components may include software components that may be executed by one or more processors, hardware components, or combinations thereof. It should be appreciated that various different system configurations are possible, which may be different from distributed system 800. The embodiment shown in FIG. 8 is thus one example of a distributed system for implementing an embodiment system and is not intended to be limiting.

Users may use client computing devices 802, 804, 806, 808, and/or 810 for techniques for enabling software assurance in a cloud environment using conversion of data transmission protocols, in accordance with the teachings of this disclosure. A client device may provide an interface that enables a user of the client device to interact with the client device. The client device may also output information to the user via this interface. Although FIG. 8 depicts only five client computing devices, any number of client computing devices may be supported.

The client devices may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux® or Linux-like operating systems such as Oracle® Linux and Google Chrome® OS) including various mobile operating systems (e.g., Microsoft Windows Mobile®, iOS®, Windows Phone®, Android®, HarmonyOS®, Tizen®, KaiOS®, Sailfish® OS, Ubuntu® Touch, CalyxOS®). Portable handheld devices may include cellular phones, smartphones, (e.g., an iPhone®), tablets (e.g., iPad®), and the like. Virtual personal assistants such as Amazon® Alexa®, Google® Assistant, Microsoft® Cortana®, Apple® Siri®, and others may be implemented on devices with a microphone and/or camera to receive user or environmental inputs, as well as a speaker and/or display to respond to the inputs. Wearable devices may include Apple® Watch, Samsung Galaxy® Watch, Meta Quest®, Ray-Ban® Meta® smart glasses, Snap® Spectacles, and other devices. Gaming systems may include various handheld gaming devices, Internet-enabled gaming devices (e.g., a Microsoft Xbox® gaming console with or without a Kinect® gesture input device, Sony PlayStation® system, Nintendo Switch®, and other devices), and the like. The client devices may be capable of executing various different applications such as various Internet-related apps, communication applications (e.g., e-mail applications, short message service (SMS) applications) and may use various communication protocols.

Network(s) 812 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 812 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 814 may be composed of one or more general purpose computers, specialized server computers (including, by way of example, PC (personal computer) servers, UNIX® servers, LINIX® servers, mid-range servers, mainframe computers, rack-mounted servers, etc.), server farms, server clusters, a Real Application Cluster (RAC), database servers, or any other appropriate arrangement and/or combination. Server 814 can include one or more virtual machines running virtual operating systems, or other computing architectures involving virtualization such as one or more flexible pools of logical storage devices that can be virtualized to maintain virtual storage devices for the server. In various aspects, server 814 may be adapted to run one or more services or software applications that provide the functionality described in the foregoing disclosure.

The computing systems in server 814 may run one or more operating systems including any of those discussed above, as well as any commercially available server operating system. Server 814 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 814 may include one or more applications to analyze and consolidate data feeds and/or event updates received from users of client computing devices 802, 804, 806, 808, and/or 810. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 814 may also include one or more applications to display the data feeds and/or real-time events via one or more display devices of client computing devices 802, 804, 806, 808, and/or 810.

Distributed system 800 may also include one or more data repositories 816, 818. These data repositories may be used to store data and other information in certain aspects. For example, one or more of the data repositories 816, 818 may be used to store information for techniques for enabling software assurance in a cloud environment using conversion of data transmission protocols. Data repositories 816, 818 may reside in a variety of locations. For example, a data repository used by server 814 may be local to server 814 or may be remote from server 814 and in communication with server 814 via a network-based or dedicated connection. Data repositories 816, 818 may be of different types. In certain aspects, a data repository used by server 814 may be a database, for example, a relational database, a container database, an Exadata® storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 816, 818 may also be used by applications to store application data. The data repositories used by applications may be of different types such as, for example, a key-value store repository, an object store repository, or a general storage repository supported by a file system.

In one embodiment, server 814 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 9:
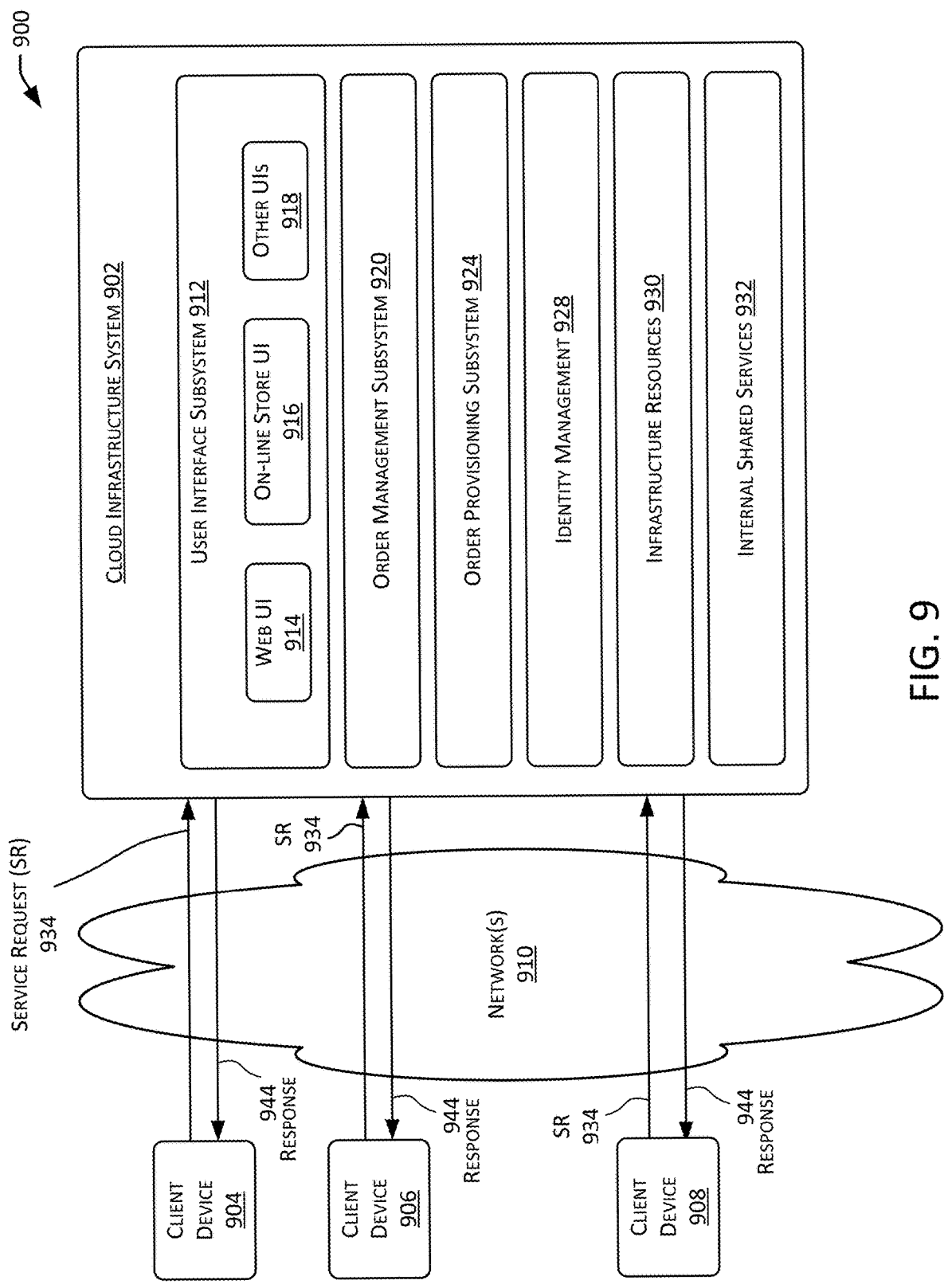
FIG. 9 is a simplified block diagram of one or more components of a system environment by which services provided by one or more components of an embodiment system may be offered as cloud services, in accordance with certain aspects.

FIG. 9 is a simplified block diagram of a cloud-based system environment in which techniques are implemented for enabling software assurance in a cloud environment using conversion of data transmission protocols, in accordance with certain aspects. In the embodiment depicted in FIG. 9, cloud infrastructure system 902 may provide one or more cloud services that may be requested by users using one or more client computing devices 904, 906, and 908. Cloud infrastructure system 902 may comprise one or more computers and/or servers that may include those described above for server 814. The computers in cloud infrastructure system 902 may be organized as general purpose computers, specialized server computers, server farms, server clusters, or any other appropriate arrangement and/or combination.

Network(s) 910 may facilitate communication and exchange of data between clients 904, 906, and 908 and cloud infrastructure system 902. Network(s) 910 may include one or more networks. The networks may be of the same or different types. Network(s) 910 may support one or more communication protocols, including wired and/or wireless protocols, for facilitating the communications.

The embodiment depicted in FIG. 9 is only one example of a cloud infrastructure system and is not intended to be limiting. It should be appreciated that, in some other aspects, cloud infrastructure system 902 may have more or fewer components than those depicted in FIG. 9, may combine two or more components, or may have a different configuration or arrangement of components. For example, although FIG. 9 depicts three client computing devices, any number of client computing devices may be supported in alternative aspects.

The term cloud service is generally used to refer to a service that is made available to users on demand and via a communication network such as the Internet by systems (e.g., cloud infrastructure system 902) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 910 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation®, such as database services, middleware services, application services, and others.

In certain aspects, cloud infrastructure system 902 may provide one or more cloud services using different models such as under a Software as a Service (SaaS) model, a Platform as a Service (PaaS) model, an Infrastructure as a Service (IaaS) model, a Data as a Service (DaaS) model, and others, including hybrid service models. Cloud infrastructure system 902 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 902. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, buIDL, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

A DaaS model is generally used to provide data as a service. Datasets may searched, combined, summarized, and downloaded or placed into use between applications. For example, user profile data may be updated by one application and provided to another application. As another example, summaries of user profile information generated based on a dataset may be used to enrich another dataset.

Cloud services are generally provided on an on-demand self-service basis, subscription-based, elastically scalable, reliable, highly available, and secure manner. For example, a tenant, via a subscription order, may order one or more services provided by cloud infrastructure system 902. Cloud infrastructure system 902 then performs processing to provide the services requested in the tenant's subscription order. Cloud infrastructure system 902 may be configured to provide one or even multiple cloud services.

Cloud infrastructure system 902 may provide the cloud services via different deployment models. In a public cloud model, cloud infrastructure system 902 may be owned by a third party cloud services provider and the cloud services are offered to any general public tenant, where the tenant can be an individual or an enterprise. In certain other aspects, under a private cloud model, cloud infrastructure system 902 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 902 and the services provided may be shared by several organizations in a related community. Various other models such as hybrids of the above mentioned models may also be used.

Client computing devices 904, 906, and 908 may be of different types (such as devices 802, 804, 806, and 808 depicted in FIG. 8) and may be capable of operating one or more client applications. A user may use a client device to interact with cloud infrastructure system 902, such as to request a service provided by cloud infrastructure system 902.

In some aspects, the processing performed by cloud infrastructure system 902 for providing chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 902 for determining the intent of an utterance. The data used for this analysis may include structured data (e.g., data stored in a database or structured according to a structured model) and/or unstructured data (e.g., data blobs (binary large objects)).

As depicted in the embodiment in FIG. 9, cloud infrastructure system 902 may include infrastructure resources 930 that are utilized for facilitating the provision of various cloud services offered by cloud infrastructure system 902. Infrastructure resources 930 may include, for example, processing resources, storage or memory resources, networking resources, and the like.

In certain aspects, to facilitate efficient provisioning of these resources for supporting the various cloud services provided by cloud infrastructure system 902 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 902 may itself internally use services 932 that are shared by different components of cloud infrastructure system 902 and which facilitate the provisioning of services by cloud infrastructure system 902. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 902 may comprise multiple subsystems. These subsystems may be implemented in software, or hardware, or combinations thereof. As depicted in FIG. 9, the subsystems may include a user interface subsystem 912 that enables users of cloud infrastructure system 902 to interact with cloud infrastructure system 902. User interface subsystem 912 may include various different interfaces such as a web interface 914, an online store interface 916 where cloud services provided by cloud infrastructure system 902 are advertised and are purchasable by a consumer, and other interfaces 918. For example, a tenant may, using a client device, request (service request 934) one or more services provided by cloud infrastructure system 902 using one or more of interfaces 914, 916, and 918. For example, a tenant may access the online store, browse cloud services offered by cloud infrastructure system 902, and place a subscription order for one or more services offered by cloud infrastructure system 902 that the tenant wishes to subscribe to. The service request may include information identifying the tenant and one or more services that the tenant desires to subscribe to. For example, a tenant may place a subscription order for a chatbot related service offered by cloud infrastructure system 902. As part of the order, the client may provide information identifying the input (e.g. utterances).

In certain aspects, such as the embodiment depicted in FIG. 9, cloud infrastructure system 902 may comprise an order management subsystem (OMS) 920 that is configured to process the new order. As part of this processing, OMS 920 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 920 may then invoke the order provisioning subsystem (OPS) 924 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 924 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 902 may send a response or notification 944 to the requesting tenant to indicate when the requested service is now ready for use. In some instances, information (e.g., a link) may be sent to the tenant that enables the tenant to start using and availing the benefits of the requested services.

Cloud infrastructure system 902 may provide services to multiple tenants. For each tenant, cloud infrastructure system 902 is responsible for managing information related to one or more subscription orders received from the tenant, maintaining tenant data related to the orders, and providing the requested services to the tenant or clients of the tenant. Cloud infrastructure system 902 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 902 may provide services to multiple tenants in parallel. Cloud infrastructure system 902 may store information for these tenants, including possibly proprietary information. In certain aspects, cloud infrastructure system 902 comprises an identity management subsystem (IMS) 928 that is configured to manage tenant's information and provide the separation of the managed information such that information related to one tenant is not accessible by another tenant. IMS 928 may be configured to provide various security-related services such as identity services, such as information access management, authentication and authorization services, services for managing tenant identities and roles and related capabilities, and the like.

Figure 10:
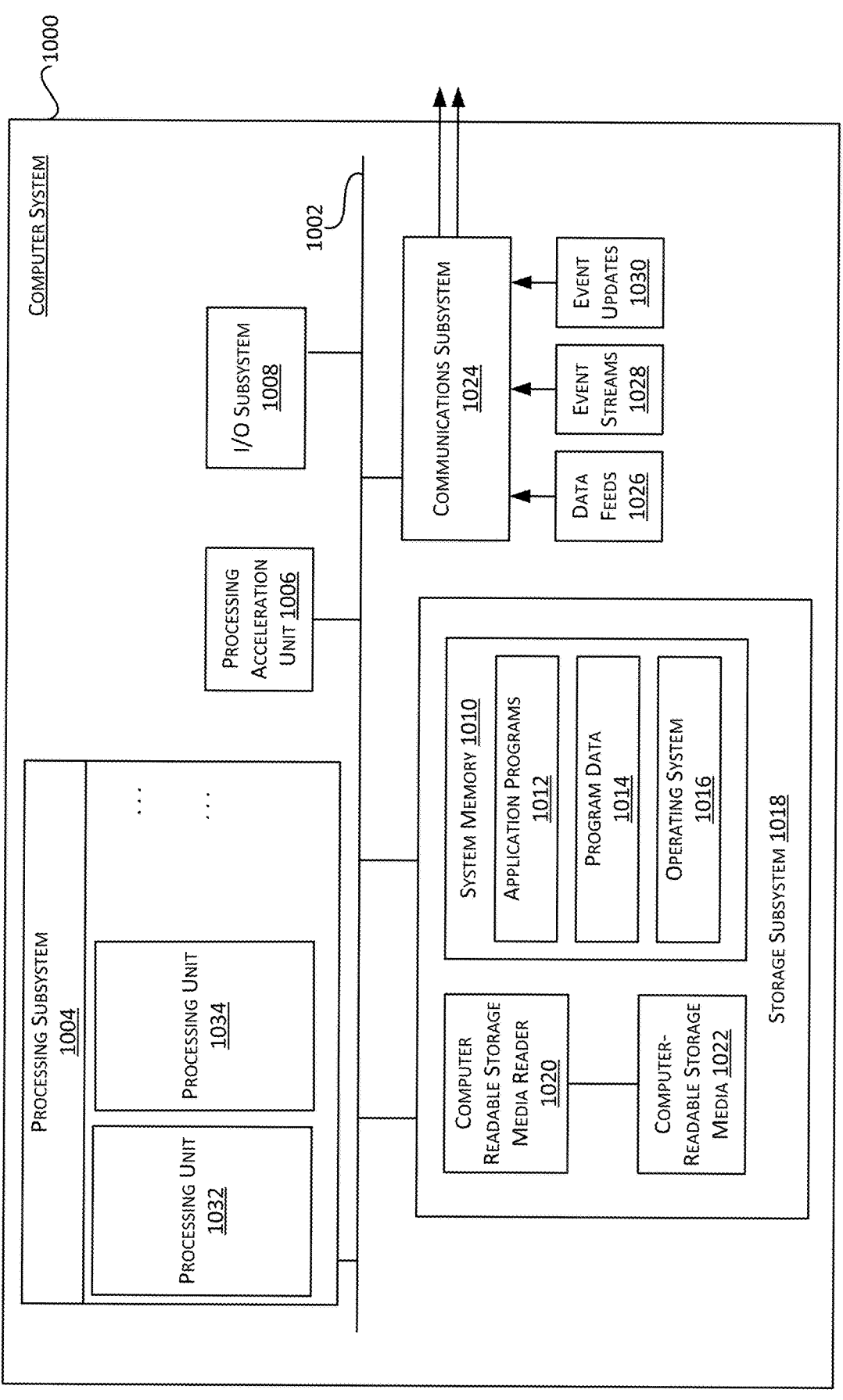
FIG. 10 illustrates an example computer system that may be used to implement certain aspects.

FIG. 10 illustrates an exemplary computer system 1000 that may be used to implement certain aspects. As shown in FIG. 10, computer system 1000 includes various subsystems including a processing subsystem 1004 that communicates with a number of other subsystems via a bus subsystem 1002. These other subsystems may include a processing acceleration unit 1006, an I/O subsystem 1008, a storage subsystem 1018, and a communications subsystem 1024. Storage subsystem 1018 may include non-transitory computer-readable storage media including storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative aspects of the bus subsystem may utilize multiple buses. Bus subsystem 1002 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1004 controls the operation of computer system 1000 and may comprise one or more processors, application specific integrated circuits (ASICs), or field programmable gate arrays (FPGAs). The processors may be single core or multicore processors. The processing resources of computer system 1000 can be organized into one or more processing units 1032, 1034, etc. A processing unit may include one or more processors, one or more cores from the same or different processors, a combination of cores and processors, or other combinations of cores and processors. In some aspects, processing subsystem 1004 can include one or more special purpose co-processors such as graphics processors, digital signal processors (DSPs), or the like. In some aspects, some or all of the processing units of processing subsystem 1004 can be implemented using customized circuits, such as application specific integrated circuits (ASICs), or field programmable gate arrays (FPGAs).

In some aspects, the processing units in processing subsystem 1004 can execute instructions stored in system memory 1010 or on computer readable storage media 1022. In various aspects, the processing units can execute a variety of programs or code instructions and can maintain multiple concurrently executing programs or processes. At any given time, some or all of the program code to be executed can be resident in system memory 1010 and/or on computer-readable storage media 1022 including potentially on one or more storage devices. Through suitable programming, processing subsystem 1004 can provide various functionalities described above. In instances where computer system 1000 is executing one or more virtual machines, one or more processing units may be allocated to each virtual machine.

In certain aspects, a processing acceleration unit 1006 may optionally be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term input device is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Meta Quest® controller, Microsoft Kinect® motion sensor, the Microsoft Xbox® 360 game controller, or devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems (e.g., Siri® navigator or Amazon Alexa®) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 1000 to a user or other computer. User interface output devices may include a display subsystem, indicator lights, or non-visual displays such as audio output devices, etc. The display subsystem may be any device for outputting a digital picture. Example display devices include flat panel display devices such as those using a light emitting diode (LED) display, a liquid crystal display (LCD) or plasma display, a projection device, a touch screen, a desktop or laptop computer monitor, and the like. As another example, wearable display devices such as Meta Quest® or Microsoft HoloLens® may be mounted to the user for displaying information. User interface output devices may include, without limitation, a variety of display devices that visually convey text, graphics, and audio/video information such as monitors, printers, speakers, headphones, automotive navigation systems, plotters, voice output devices, and modems.

Storage subsystem 1018 provides a repository or data store for storing information and data that is used by computer system 1000. Storage subsystem 1018 provides a tangible non-transitory computer-readable storage medium for storing the basic programming and data constructs that provide the functionality of some aspects. Storage subsystem 1018 may store software (e.g., programs, code modules, instructions) that when executed by processing subsystem

1004 provides the functionality described above. The software may be executed by one or more processing units of processing subsystem 1004. Storage subsystem 1018 may also provide a repository for storing data used in accordance with the teachings of this disclosure.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM), dynamic random access memory (DRAM), and the like.

By way of example, and not limitation, as depicted in FIG. 10, system memory 1010 may load application programs 1012 that are being executed, which may include various applications such as Web browsers, mid-tier applications, relational database management systems (RDBMS), etc., program data 1014, and an operating system 1016. By way of example, operating system 1016 may include various versions of Microsoft Windows®, Apple Macintosh®, and/or Linux® operating systems, a variety of commercially-available UNIX® or UNIX-like operating systems (including without limitation the variety of GNU/Linux operating systems, the Oracle Linux®, Google Chrome® OS, and the like) and/or mobile operating systems such as iOS, Windows® Phone, Android® OS, and others.

Computer-readable storage media 1022 may store programming and data constructs that provide the functionality of some aspects. Computer-readable media 1022 may provide storage of computer-readable instructions, data structures, program modules, and other data for computer system 1000. Software (programs, code modules, instructions) that, when executed by processing subsystem 1004 provides the functionality described above, may be stored in storage subsystem 1018. By way of example, computer-readable storage media 1022 may include non-volatile memory such as a hard disk drive, a magnetic disk drive, an optical disk drive such as a CD ROM, digital video disc (DVD), a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 1018 may also include a computer-readable storage media reader 1020 that can further be connected to computer-readable storage media 1022. Reader 1020 may receive and be configured to read data from a memory device such as a disk, a flash drive, etc.

In certain aspects, computer system 1000 may support virtualization technologies, including but not limited to virtualization of processing and memory resources. For example, computer system 1000 may provide support for executing one or more virtual machines. In certain aspects, computer system 1000 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1000. Accordingly, multiple operating systems may potentially be run concurrently by computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices. For example, the communications subsystem may be used to transmit a response to a user regarding the inquiry for a chatbot.

Communications subsystem 1024 may support both wired and/or wireless communication protocols. For example, in certain aspects, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 1024 can provide wired network connectivity (e.g., Ethernet) in addition to or instead of a wireless interface.

Communications subsystem 1024 can receive and transmit data in various forms. For example, in some aspects, in addition to other forms, communications subsystem 1024 may receive input communications in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1024 may also be configured to communicate data from computer system 1000 to other computer systems or networks. The data may be communicated in various different forms such as structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a personal digital assistant (PDA)), a wearable device (e.g., a Meta Quest® head mounted display), a personal computer, a workstation, a mainframe, a kiosk, a server rack, or any other data processing system. Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A non-transitory computer-readable medium including instructions that when executed by one or more processors, cause a system including the one or more processors to perform operations including:

receiving, at a first adapter and from a first component, data using a first communication protocol; and transmitting, by the first adapter and to a proxy, the data using a second communication protocol, such that the proxy:

audits the data to check for non-permissible information within the data, and performs one of:

(i) in response to detecting presence of the non-permissible information within the data, blocks passage of the data to its intended destination, or (ii) in response to detecting absence of the non-permissible information within the data, allows passage of the data to a second adapter using the second communication protocol, to facilitate transmission of the data from the second adapter to a second component using the first communication protocol;

wherein the first communication protocol and the second communication protocol are different, wherein the proxy is within a tenancy of a cloud environment, wherein the first adapter and the first component are within a first section of the cloud environment, wherein the second adapter and the second component are within a second section of the cloud environment, and wherein neither of the first section and the second section is within the tenancy of the cloud environment.

2. The non-transitory computer-readable medium of claim 1, wherein the first section is located in a first country, and wherein the second section is located in a second country.

3. The non-transitory computer-readable medium of claim 1, wherein:

the tenancy is a first tenancy;

the first section is within a second tenancy of the cloud environment; and the second section is within (i) the second tenancy of the cloud environment or (ii) a third tenancy of the cloud environment that is different from each of the first and second tenancies.

4. The non-transitory computer-readable medium of claim 1, wherein the operations further include:

receiving, at the second adapter and from the proxy, the data using the second communication protocol; and transmitting, by the second adapter and to the second component, the data using the first communication protocol.

5. The non-transitory computer-readable medium of claim 1, wherein the operations further include:

accessing, by the first adapter, the first component, the second adapter, and the second component, an interface description language from a protocol library.

6. The non-transitory computer-readable medium of claim 1, wherein the operations further include:

accessing, by the first adapter and the first component, a first interface description language from a first protocol library; and accessing, by the second adapter and the second component, a second interface description language from a second protocol library.

7. The non-transitory computer-readable medium of claim 1, wherein:

the first adapter comprises: (i) a server for accepting a connection from the first component for the first communication protocol, and acting as a reverse proxy, and (ii) a first protocol converter for establishing a bidirectional connection with the proxy using the second communication protocol; and the second adapter comprises: (i) a client for establishing a connection with the second component using the first communication protocol, and acting as a forward proxy, and (ii) a second protocol converter for establishing a bidirectional connection with the proxy using the second communication protocol.

8. The non-transitory computer-readable medium of claim 1, wherein the first communication protocol is a remote procedure calls (RPC) protocol.

9. The non-transitory computer-readable medium of claim 1, wherein the first communication protocol is a gRPC (gRPC remote procedure calls) protocol.

10. The non-transitory computer-readable medium of claim 1, wherein the second communication protocol is a bidirectional persistent communication protocol.

11. The non-transitory computer-readable medium of claim 1, wherein the second communication protocol is a Websocket protocol.

12. A non-transitory computer-readable medium including instructions that when executed by one or more processors, cause a system including the one or more processors to perform operations including:

receiving, at a proxy and from a first adapter, data using a first communication protocol, wherein the first adapter receives the data from a first component using a second communication protocol, and transmits the data to the proxy using the first communication protocol;

auditing, at the proxy, the data to check for non-permissible information within the data; and performing one of:

(i) in response to detecting presence of the non-permissible information within the data, blocking passage of the data to its intended destination, or (ii) in response to detecting absence of the non-permissible information within the data, allowing passage of the data to a second adapter using the first communication protocol, to facilitate transmission of the data from the second adapter to a second component using the second communication protocol;

wherein the first communication protocol and the second communication protocol are different, wherein the proxy is within a tenancy of a cloud environment, wherein the first adapter and the first component are within a first section of the cloud environment, wherein the second adapter and the second component are within a second section of the cloud environment, and wherein neither of the first section and the second section is within the tenancy of the cloud environment.

13. The non-transitory computer-readable medium of claim 12, wherein the first section is located in a first country, wherein the second section is located in a second country, and wherein the proxy is located within (i) the first country, (ii) the second country, or (iii) a third country different from each of the first and second countries.

14. The non-transitory computer-readable medium of claim 12, wherein:

the tenancy is a first tenancy;

the first section is within a second tenancy of the cloud environment; and the second section is within (i) the second tenancy of the cloud environment or (ii) a third tenancy of the cloud environment that is different from each of the first and second tenancies.

15. The non-transitory computer-readable medium of claim 12, wherein the second communication protocol is a gRPC (gRPC remote procedure calls protocol) communication protocol.

16. The non-transitory computer-readable medium of claim 12, wherein the first communication protocol is a bidirectional persistent communication protocol.

17. The non-transitory computer-readable medium of claim 12, wherein the first communication protocol is a Websocket protocol.

18. A computer implemented method comprising:

receiving, at a first adapter and from a first component, data using a first communication protocol; and transmitting, by the first adapter and to a proxy, the data using a second communication protocol, such that the proxy audits the data to check for non-permissible information within the data, and performs one of: (i) in response to detecting presence of the non-permissible information within the data, blocks passage of the data to its intended destination, or (ii) in response to detecting absence of the non-permissible information within the data, allows passage of the data to a second adapter using the second communication protocol, to facilitate transmission of the data from the second adapter to a second component using the first communication protocol;

wherein the first communication protocol and the second communication protocol are different, wherein the proxy is within a tenancy of a cloud environment, wherein the first adapter and the first component are within a first section of the cloud environment, wherein the second adapter and the second component are within a second section of the cloud environment, and wherein neither of the first section and the second section is within the tenancy of the cloud environment.

19. The method of claim 18, wherein the first section is located in a first country, and wherein the second section is located in a second country.

20. The method of claim 18, wherein:

the tenancy is a first tenancy;

the first section is within a second tenancy of the cloud environment; and the second section is within (i) the second tenancy of the cloud environment or (ii) a third tenancy of the cloud environment that is different from each of the first and second tenancies.

21. A method comprising:

receiving, at a proxy and from a first adapter, data using a first communication protocol, wherein the first adapter receives the data from a first component using a second communication protocol, and transmits the data to the proxy using the first communication protocol;

auditing, at the proxy, the data to check for non-permissible information within the data; and performing one of:

(i) in response to a detecting presence of the non-permissible information within the data, blocking passage of the data to its intended destination, or (ii) in response to detecting absence of the non-permissible information within the data, allowing passage of the data to a second adapter using the first communication protocol, to facilitate transmission of the data from the second adapter to a second component using the second communication protocol;

wherein the first communication protocol and the second communication protocol are different, wherein the proxy is within a tenancy of a cloud environment, wherein the first adapter and the first component are within a first section of the cloud environment, wherein the second adapter and the second component are within a second section of the cloud environment, and wherein neither of the first section and the second section is within the tenancy of the cloud environment.

22. The method of claim 21, wherein:

the tenancy is a first tenancy;

the first section is within a second tenancy of the cloud environment; and the second section is within (i) the second tenancy of the cloud environment or (ii) a third tenancy of the cloud environment that is different from each of the first and second tenancies.

23. The method of claim 21, wherein the first communication protocol is a bidirectional persistent communication protocol, and wherein the second communication protocol is a gRPC (gRPC remote procedure calls protocol) communication protocol.

24. A system comprising:

one or more processors;

one or more non-transitory computer-readable media storing instructions, which, when executed by the system, cause the system to perform a set of actions including:

receiving, at a proxy and from a first adapter, data using a first communication protocol, wherein the first adapter receives the data from a first component using a second communication protocol, and transmits the data to the proxy using the first communication protocol;

auditing, at the proxy, the data to check for non-permissible information within the data; and performing one of:

(i) in response to a detecting presence of the non-permissible information within the data, blocking passage of the data to its intended destination, or (ii) in response to detecting absence of the non-permissible information within the data, allowing passage of the data to a second adapter using the first communication protocol, to facilitate transmission of the data from the second adapter to a second component using the second communication protocol;

wherein the first communication protocol and the second communication protocol are different, wherein the proxy is within a tenancy of a cloud environment, wherein the first adapter and the first component are within a first section of the cloud environment, wherein the second adapter and the second component are within a second section of the cloud environment, and wherein neither of the first section and the second section is within the tenancy of the cloud environment.

25. The system of claim 24, wherein:

the tenancy is a first tenancy;

the first section is within a second tenancy of the cloud environment; and the second section is within (i) the second tenancy of the cloud environment or (ii) a third tenancy of the cloud environment that is different from each of the first and second tenancies.

26. A system comprising:

one or more processors;

one or more non-transitory computer-readable media storing instructions, which, when executed by the system, cause the system to perform a set of actions including:

receiving, at a first adapter and from a first component, data using a first communication protocol; and transmitting, by the first adapter and to a proxy, the data using a second communication protocol, such that the proxy:

audits the data to check for non-permissible information within the data, and performs one of:

(i) in response to detecting presence of the non-permissible information within the data, blocks passage of the data to its intended destination, or (ii) in response to detecting absence of the non-permissible information within the data, allows passage of the data to a second adapter using the second communication protocol, to facilitate transmission of the data from the second adapter to a second component using the first communication protocol;

wherein the first communication protocol and the second communication protocol are different, wherein the proxy is within a tenancy of a cloud environment, wherein the first adapter and the first component are within a first section of the cloud environment, wherein the second adapter and the second component are within a second section of the cloud environment, and wherein neither of the first section and the second section is within the tenancy of the cloud environment.

* * * * *